United States Patent [19]

Kimura

[11] Patent Number: 5,163,003
[45] Date of Patent: Nov. 10, 1992

[54] APPARATUS AND METHOD FOR READING FROM AND WRITING TO A MAGNETIC RECORDING MEDIUM

[75] Inventor: Toshiki Kimura, Yokohama, Japan

[73] Assignee: Fujitsu Limited, Kawasaki, Japan

[21] Appl. No.: 500,055

[22] Filed: Mar. 27, 1990

[30] Foreign Application Priority Data

Mar. 31, 1989 [JP] Japan ................................. 1-81916
Aug. 17, 1989 [JP] Japan ................................. 1-211988

[51] Int. Cl.⁵ .............................................. G11B 5/09
[52] U.S. Cl. ...................................................... 360/45
[58] Field of Search ................................... 360/45, 46

[56] References Cited

U.S. PATENT DOCUMENTS

| | | | |
|---|---|---|---|
| 465,541 | 1/1890 | Kimura | 360/45 |
| 4,081,756 | 3/1978 | Price et al. | 360/48 X |
| 4,319,288 | 3/1982 | Lee | 360/46 |
| 4,553,178 | 11/1985 | Lynch | 360/45 |
| 4,607,295 | 8/1986 | Uno | 360/45 |
| 4,774,601 | 9/1988 | Ouchi et al. | 360/46 |

FOREIGN PATENT DOCUMENTS

| | | |
|---|---|---|
| 3338877A1 | 10/1983 | Fed. Rep. of Germany . |
| 59-87610 | 5/1984 | Japan . |
| 61-99906 | 5/1986 | Japan . |
| 2-201708 | 8/1990 | Japan . |

Primary Examiner—David J. Severin
Attorney, Agent, or Firm—Staas & Halsey

[57] ABSTRACT

A data reproducing circuit, and more particularly, a data reproducing circuit which records magnetization reversal patterns corresponding to a written digital signal onto a magnetic recording medium, and converts a received analog signal from the magnetic recording medium into a digital signal. The present invention has a pre-shift circuit to perform peak shift compensation in the recording process, an equalizer to perform peak shift compensation in the reproducing process, and a digital data reproducing circuit to reproduce data by differentiating the equalized signal received from the equalizer and generating a window signal. The equalizer means contains the first equalizer which compensates the peak position shifting in the received analog signal from the magnetic head and outputs the equalized signal used for differentiation, and the second equalizer which corrects the peak level variation of the analog signal and outputs the equalized signal used for window signal generation. Use of these equalizers with the pre-shift circuit assures margins for noises in the reproducing process along with a sufficient peak shift compensation.

26 Claims, 26 Drawing Sheets

FIG. 7B
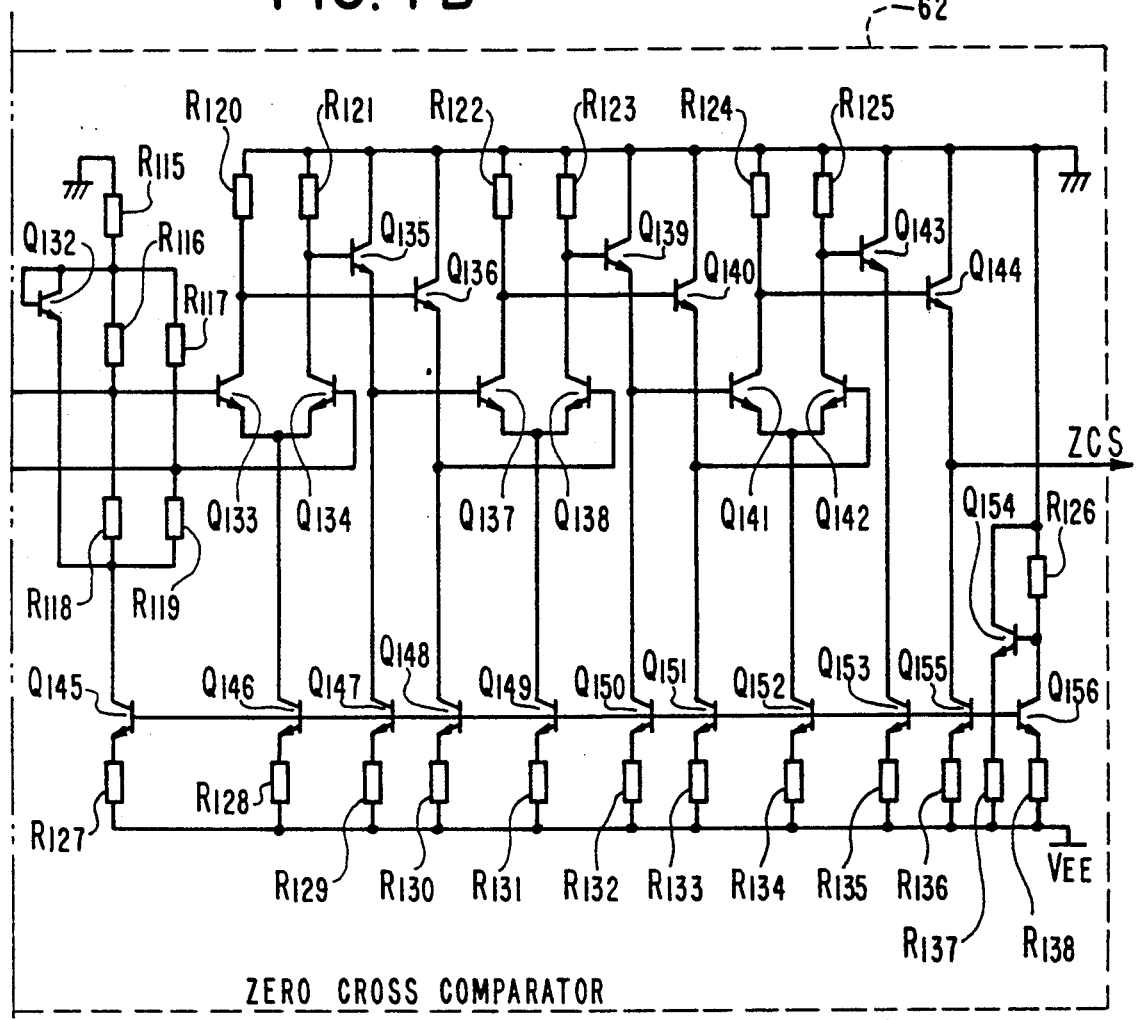
ZERO CROSS COMPARATOR
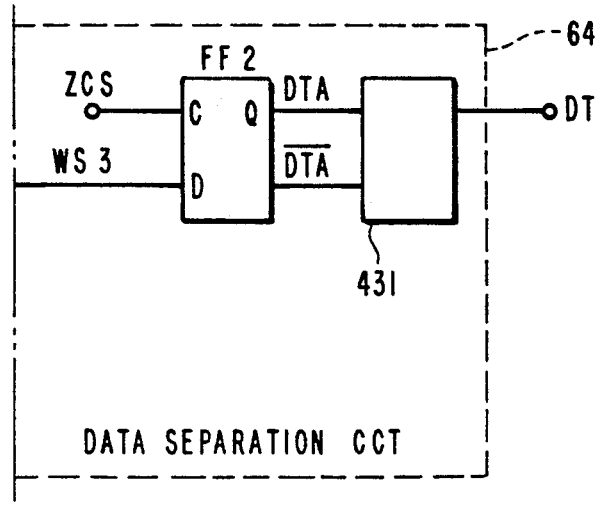
DATA SEPARATION CCT

APPARATUS AND METHOD FOR READING FROM AND WRITING TO A MAGNETIC RECORDING MEDIUM

CROSS-REFERENCE TO RELATED APPLICATIONS

This application may be related to U.S. patent application Ser. No. 07/323,943 filed Mar. 15, 1989 and U.S. patent application Ser. No. 465,541 based on Japanese Patent Application No. 1-21315 by Toshiki Kimura.

BACKGROUND OF THE INVENTION

1. Field of the Invention

The present invention relates to a data reproducing circuit, and more particularly, to a data reproducing circuit which records magnetization reversal patterns corresponding to written digital signals onto a magnetic recording medium, and converts received analog signals from the magnetic recording medium into digital signals.

2. Description of the Prior Art

The data reproducing circuit is broadly used for memory systems such as magnetic disc and magnetic drum devices. In recent years, improving recording density of magnetic media has substantially reduced intervals between magnetization reversals. The received analog signal peaks when a magnetization reversal occurs, but due to the influence of adjacent magnetization reversals, the peaks appear with certain time differences. This phenomenon is known as the peak shift. Accordingly, compensation of the peak shift is required in a data reproducing circuit. For higher record density in the future, the peak shift compensation is an important technique.

FIG. 26 is a principle view of the peak shift phenomenon. A magnetic recording medium stores binary data according to existence or non-existence of a magnetization reversal. For example, in data recording by 2-7 coding method, data to be recorded is converted into prescribed writing codes, and a magnetization reversal pattern corresponding to the writing code is recorded. The current applied to the magnetic head is reversed when the writing code is "1", which causes the magnetization direction of the magnetic recording medium to reverse so that a magnetization reversal pattern is recorded.

In the reproducing process, the received analog signal from the magnetic head should have the waveform shown with broken lines in relation to the magnetization reversal positions, but it actually shows the waveform shown with the solid line, which is obtained by integrating the broken line waveforms. Though the received analog signal should have peaks at magnetization reversals, the peaks appear with some deviation from the positions where the magnetization reversals occur, due to the influence of the adjacent magnetization reversals. This phenomenon is referred to as the "peak shift." In addition to the peak shift, peak level decline due to interference by waveforms is also observed.

The peaks shift to the side with a larger distance from the adjacent magnetization reversal. In terms of frequency of the magnetization reversals, a peak shifts to the side where the frequency is lower, when comparing the forward and backward frequencies. The larger the difference of the forward and backward frequencies is, the further the peak shifts.

FIG. 27 shows the relation between the frequencies of magnetization reversals and the peak level of the received analog signal. In the figure, $f_{max}$ indicates the maximum and $f_{min}$ indicates the minimum frequency of the magnetization reversal intervals. In 2-7 coding, two 1s, which represent magnetization reversals, sandwich two 0s for the maximum frequency, and 7 0s for the minimum frequency.

To solve the peak shift problem, some methods have been conventionally proposed as shown below.

One is the peak shift compensation in the recording process, which is disclosed in the Japanese Patent Application Laid-open Print No. 59-087610 and U.S. Pat. No. 4,607,295. By providing a shift equivalent to the expected peak shift amount in the opposite direction to that of the peak shift phenomenon when a magnetization reversal is recorded onto the magnetic recording medium, the peak shift is compensated so that the peak of the received analog signal can be obtained at the original timings when reproduced. This method requires a pre-shift circuit which analyzes the patterns of the codes to be recorded on the magnetic recording medium, and controls the recording process to provide a certain shift to the magnetization reversals.

The above peak shift compensation using the above pre-shift results in a higher recording frequency, i.e. narrowing intervals between magnetization reversals. Extremely narrow intervals between the magnetization reversals increases the interference by the waveform, and as shown in FIG. 27, lowers the peak level of the received analog signal from the magnetic head. Generally, when a received analog signal peak is higher than the predetermined slice level, a magnetization reversal is deemed to occur. Consequently, for a lower peak level, the slice level should be also determined lower. This may result in reduction in margins for noises observed at the reproducing circuit.

Another conventional method to solve the peak shift phenomenon is the peak shift compensation in the reproducing process, which is to obtain an equalized signal by removing the peak shifts from the received analog signal from the magnetic head using a reflection type cosine equalizer.

FIG. 28 shows the construction of a reflection type cosine equalizer in a conventional embodiment.

The reflection type cosine equalizer has a delay circuit 811 having an open output end, a gain adjustment circuit 821, and a differential amplifier 831 for subtracting an output from the gain adjustment circuit 821 from the output from the delay circuit 811. The input signal f(t) is delayed at the delay circuit 811 by a delay time $\tau$, and a delayed signal is supplied to a first input terminal of the amplifier 831. An input impedance of the amplifier 831 is very high, and the delayed signal supplied to the first input terminal is reflected to the delay circuit 811. The reflected signal is further delayed at the delay circuit 811 by the delay time $\tau$. This further delayed signal is added to the gain adjustment circuit 821. The gain adjustment circuit 821 has a gain k, where $k \leq 1$. Namely, the first input terminal of the amplifier 831 receives a signal $f(t+\tau)$, and the gain adjustment circuit 821 receives signals $kf(t)$ and $kf(t+2\tau)$. As a result, as shown in FIG. 30, the differential amplifier 831 calculates a difference between an analog output $f(t+\tau)$ obtained by delaying the analog output by the delay time at the delay circuit 811 and an output $k \cdot f((t) + k \cdot f(t+2\tau)$ from the gain adjustment circuit 821, to equalize the analog output Sf into an analog output f'(t+τ) having a sharp waveform. This waveform has a cosine shape.

To completely compensate the peak shift by the above the input voltage ratio V−/V+ of the differential amplifier 831 at a high level to provide a large equalizing amount. A high gain k at the equalizer for a large equalization amount, however, amplifies the high frequency components according to the characteristics shown in FIG. 29. The amplified noise components of high range might be detected as excessive peaks during peak position detection by differentiation of the signal, which causes another peak shift problem. In addition, when the equalization amount is large, original waveform will have "shoulders" on both sides as shown in FIG. 31(b). The shoulders will be larger as the equalization amount becomes larger.

The output signal of the equalizer is used for peak position detection by differentiation, and for window signal generation by comparing it with the predetermined slice level. Accordingly, when the equalizing amount is set to a large value, the equalized signal will have large shoulders, and the noises on the shoulders might be higher than the slice level. This means that the peak shift compensation in the reproducing process also has a problem of noise margin reduction, which impedes a complete peak shift compensation.

Still another conventional method to solve the peak shift problem is to perform peak shift compensation in both recording and reproducing processes. A certain amount of pre-shift is provided in the recording process, and the remaining peak shift is compensated by the reflection type cosine equalizer in the reproducing process. In this method, the equalizing amount at the equalizer in the reproducing process should be set moderately, because the peak shift compensation is partly performed at the pre-shift circuit. Too small of an equalizing amount at the equalizer, however, cannot compensate the peak level decline due to high recording frequency, and the slice level for window signal generation cannot be set at a high level.

Writing codes include 2-7 coding and 1-7 coding methods. In 2-7 coding, a pair of 1s sandwiches at least two 0s and at most seven 0s, while in 1-7 coding, a pair of 1s sandwiches at least one 0 and at most seven 0s between them. For 2-7 coding, 1 data bit corresponds to 2 code bits, and for 1-7 coding, 2 data bits correspond to 3 code bits. When the transfer time of 1 data bit is supposed to be T, the reading time of 1 code bit is T/2 for 2-7 coding and 4T/3 for 1-7 coding. The maximum cycle of the magnetization reversal is 8T/2 for 2-7 coding and 16T/3 for 1-7 coding. Particularly in 1-7 coding, the wide recording frequency band greatly lowers the peak level at a high recording frequency.

The peak shift phenomenon above necessarily occurs for every magnetic head, regardless of the head type. For easier understanding, however, above description has been given about the case where the magnetic head is made by winding of a wire around a ferrite core (ferrite magnetic head).

On the other hand, a phenomenon observed only when a thin film magnetic head is used as the magnetic head is described below.

FIGS. 32(a) and (b) illustrates the phenomenon known as the negative edge. In this figure, (a) shows the received analog signal from a ferrite magnetic head, and (b) shows the received analog signal from a thin film magnetic head. The signals in (a) and (b) are received signals at magnetization reversals, and correspond to those expressed with broken lines in FIG. 26. The signal of FIG. 32 (a) is identical to those shown with broken lines in FIGS. 26, but does not contain any components with opposite polarity to the peak polarity of the received signal at the magnetization reversals. The signal of FIG. 32 (b) contains, unlike the signal of (a), components with opposite polarity to that of the received signal peaks (shaded parts). If the polarity of the received signal is positive, the polarity of the shaded parts is negative, and the shaded parts are called "negative edges."

When a magnetic head includes negative edges of the received analog signal, as in the case of a thin film magnetic head, the peak shift compensation should be performed taking the existence of negative edges into consideration.

For example, if all received signals at magnetization reversals expressed with broken lines in FIG. 26 have negative edges as shown in FIG. 32 (b), the received analog signal from the thin magnetic head obtained by integration of these signals would be extremely complicated. In addition, negative edges or overlapping negative edges might be detected as excessive peaks when the signal is differentiated.

When an equalizer with the construction of FIG. 28 is used, the received analog signal from the thin film magnetic head cannot be made sharper. The signal f(t+τ) contains negative edges, which are emphasized by the signals Kf(t) and Kf(t+2τ) shown in FIGS. 30 (a) and (b). Accordingly, the proper signal f'(t+τ) cannot be obtained. This may impede the peak shift compensation with an equalizer. A prior art invention proposal to solve the problem by eliminating negative edges is disclosed in the Japanese Patent Application Laid-open Print No. 61-99906. In this conventional method, the negative edge elimination and the peak shift compensation are performed in the reproducing process.

SUMMARY OF THE INVENTION

An object of the present invention is to provide a sufficient peak shift compensation.

Another object of the present invention is to ensure a sufficient margin for noises occurring during the data reproducing process.

Still another object of the present invention is to provide a sufficient peak shift compensation when the received analog signal contains negative edges.

Still another object of the present invention is to ensure a sufficient margin for noises occurring in the data reproducing process when the received analog signal contains negative edges.

According to the present invention, individual magnetization reversal positions are shifted for a certain amount from the original positions in advance according to the patterns of the written digital signal at the pre-shift means. The analog signal corresponding to the written digital signal is input to the data recording and sensing means. The first and the second equalized signals with different equalizing amounts are generated based on the received analog signal from the data recording and sensing means at the equalizing means. The reproducing signal and the digital data reproducing signal are obtained at the digital data reproducing means by the differentiation of the first equalized signal and the window signal generation from the second equalized signal.

BRIEF DESCRIPTION OF THE DRAWINGS

FIGS. 7A and 7B are diagrams to show the detailed construction of the digital data reproducing circuit shown in FIG. 5.

DESCRIPTION OF THE PREFERRED EMBODIMENT OF THE INVENTION

Figure 1:
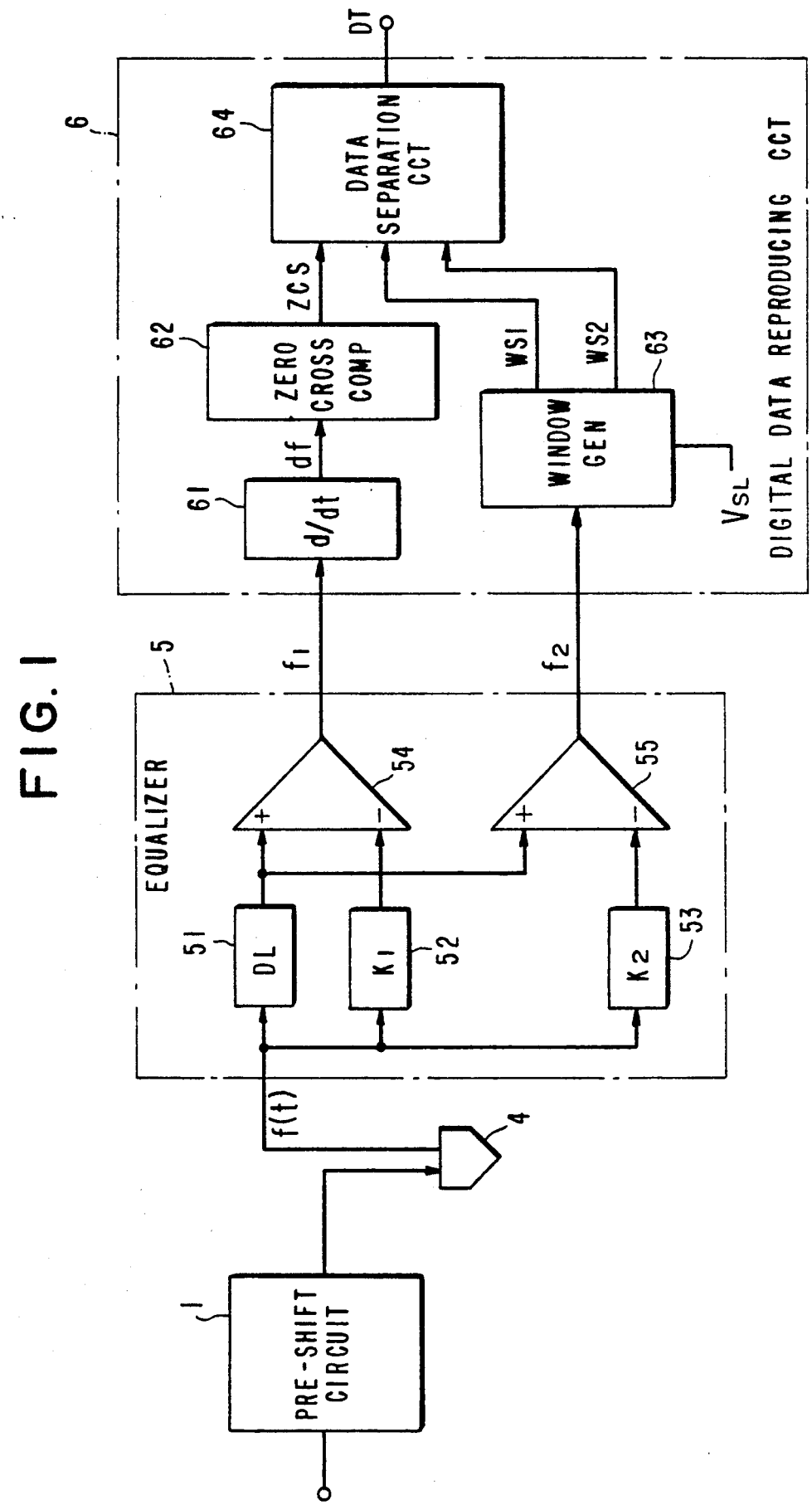
FIG. 1 is a view illustrating the basic construction for an embodiment of the present invention.

FIG. 1 shows the basic construction of a first embodiment of the present invention. In the figure, the data reproducing circuit of the first embodiment is provided with a pre-shift circuit 1, a magnetic head 4, a reflection type cosine equalizer 5, and a digital data reproducing circuit 6. The data reproducing circuit of the first embodiment is constructed so that the pre-shift circuit 1 compensates the peak shift in the data recording process, and the equalizer 5 compensates the remaining peak shift in the reproducing process. The peak shift compensation in the recording process used in this embodiment utilizes the techniques disclosed in the Japanese Patent Application Laid-open Print No. 59-087610 and U.S. Pat. No. 4,607,295; and the peak shift compensation in the reproducing process utilized the techniques disclosed in the Japanese Patent Application Laid-open Print No. 61-99906 and U.S. patent application Ser. No. 07/323,943 (inventors: Hiroshi Muto and Takashi Aikawa).

The magnetic head 4 may be provided with two separate heads for data writing and data reading, or one common head for the both functions.

Figure 2:
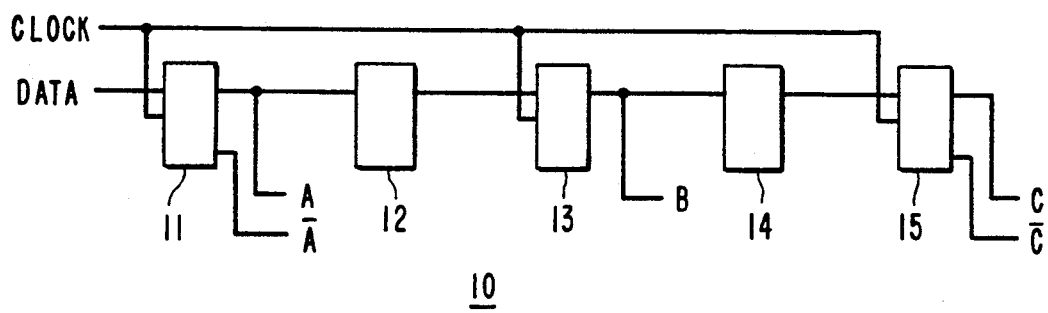
FIGS. 2 and 3 show detailed construction of the pre-shift circuit shown in FIG. 1.
Figure 3:
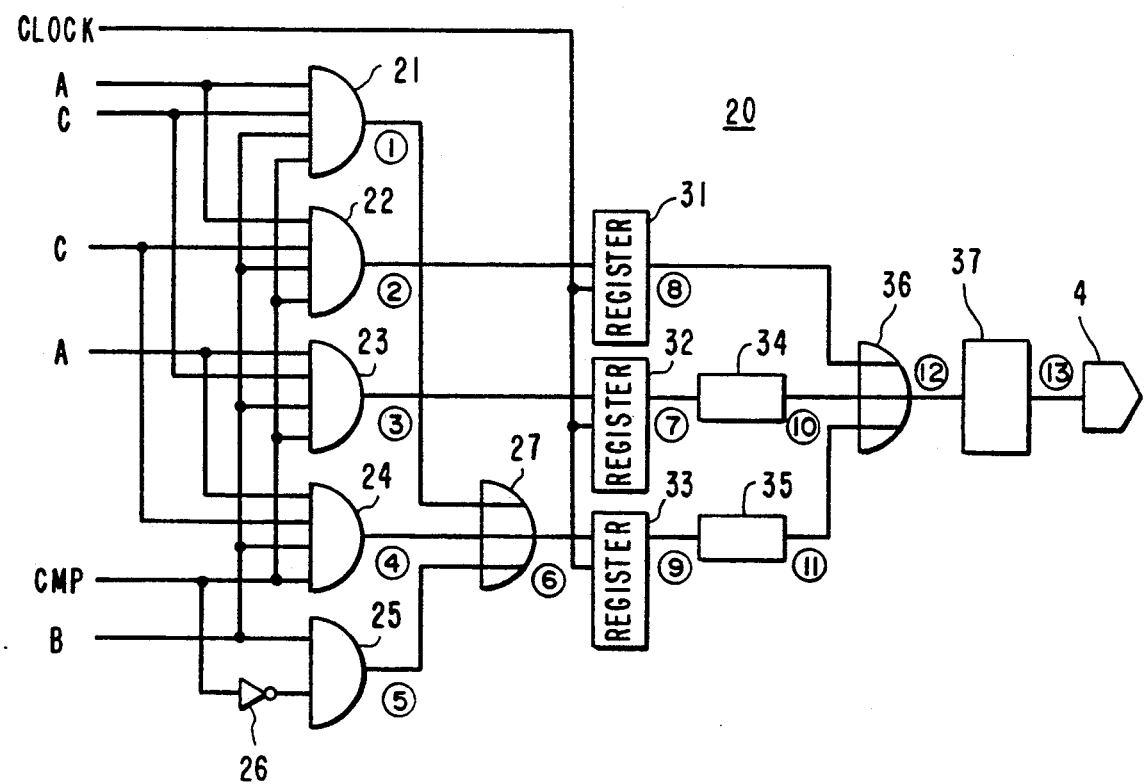

FIGS. 2 and 3 show a detailed construction of a shift register 10 and a combinational logic circuit 20 which form a pre-shift circuit 1. The shift register 10 shown in FIG. 2 includes five flip-flops (hereinafter referred to as "FF") 11, 12, 13, 14 and 15, and shifts data at every input of the clock pulse. Outputs from FF11 (referred to as A), FF13 (B) and FF15 (C) are input to the combinational logic circuit 20. In this embodiment, 1-7 coding method is adopted. When the output B is "1", the magnetization reversal timing is adjusted according to the writing codes of the outputs A and C.

The combinational logic circuit 20 shown in FIG. 3 consists of four 4-input AND circuits 21 to 24, a 2-input AND circuit 25, an inverter 26, two 3-input OR circuits 27 and 36, three registers 31 to 33, two delay circuits 34 and 35, and a write driver 37.

Pre-shifting instruction CMP input to the AND circuits 21 to 24 is to instruct whether the pre-shifting should be performed of not. Delay circuits 34 and 35 are used to set the pre-shifting amount, and delay the input signal for a delay time of 2t and t respectively. The output of the register 31 is transferred to the write driver 37 without any delay, and the outputs of the register 32 is transferred through the delay circuit 34 with the delay 2t and the output of the register 33 through the delay circuit 35 with the delay t to the write driver 37. This means that the signal with the delay t corresponds to the signal with the pre-shift amount of zero, the signal with the delay of zero corresponds to that with a certain pre-shift in the forward direction of time, and the signal with the delay of 2t corresponds to that with some pre-shift in the backward direction of time.

Figure 4:
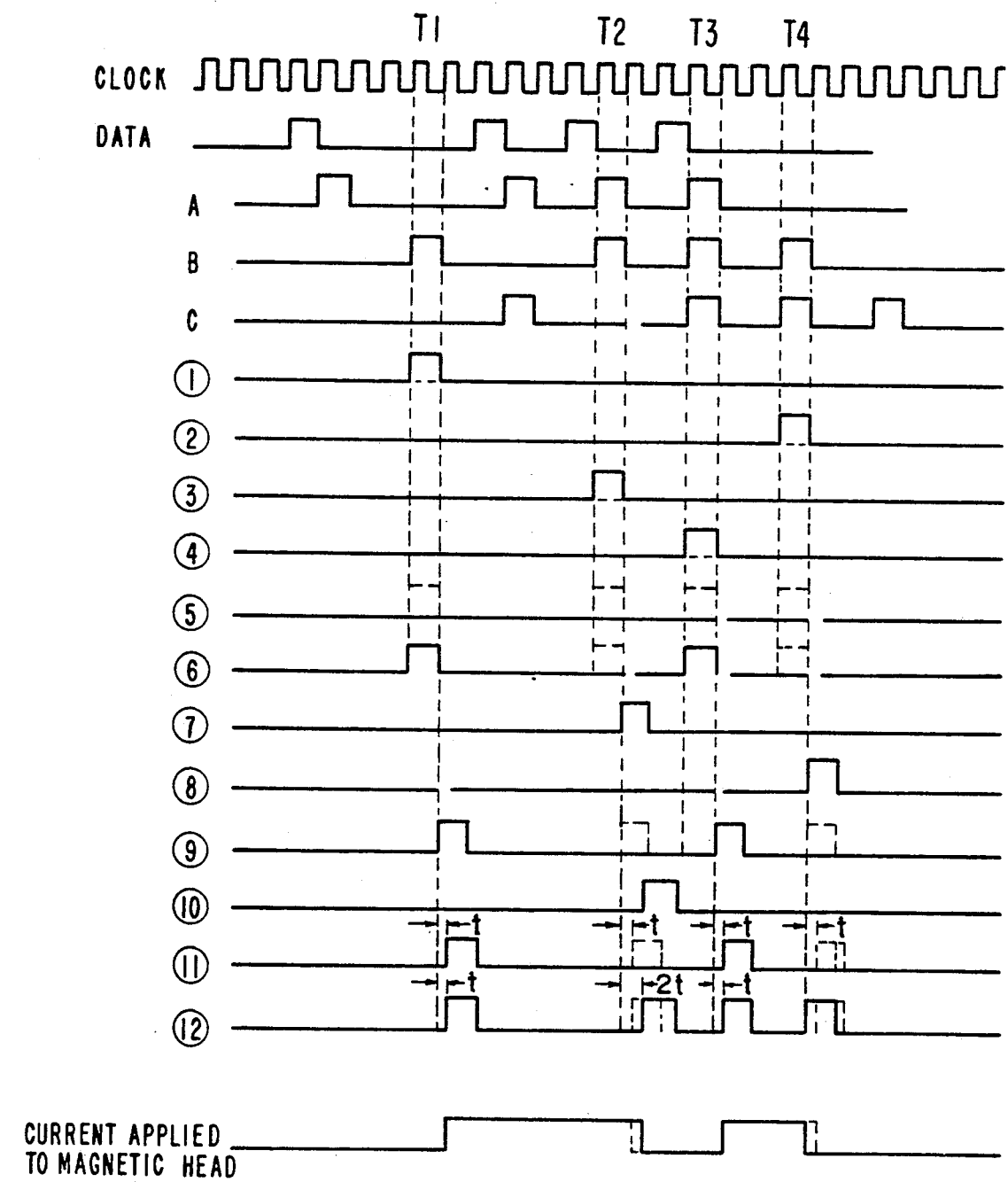
FIG. 4 illustrates the operation of the pre-shift circuit shown in FIG. 1.

FIG. 4 is a time chart illustrating the operation of the pre-shift circuit 1. CLOCK is provided to shift the DATA input to the shift register 10. For example, suppose DATA shown in the figure is input to the shift register 10. The output A will be delayed for 1 clock from DATA, the output B for 3 clocks, and the output C for 5 clocks.

First, the operation when the CMP is off, i.e. without pre-shifting is explained. In the figure, the signal waveforms drawn with solid lines are for when the CMP is on, and those drawn with broken lines are for when the CMP is off. When CMP is off, "CMP" input to the AND circuits 21 to 24 are always off, and on the other hand, the AND circuit 25 outputs the output B as it is to the OR circuit 27 (5), and the OR circuit 27 outputs the same signal to the register 33 (6). The register 33 outputs the signal with a delay of 1 clock to the delay circuit 35 (9), and the delay circuit 35 outputs the signal to the write driver 37 with a delay time of t (11). The write driver 37 reverses the current applied to the magnetic head every time the signal rises.

Next, the operation when CMP is on, i.e. pre-shifting is performed is explained. Looking at the time position T1, the output B is on and the outputs A and C are off, which turns on the output at the AND circuit 21 only (1). Thus, the signal is input to the write driver 37 with being delayed by t at the delay circuit 35. This corresponds to the pre-shift amount of zero. For example, when the output B is on and a magnetization reversal occurs, if the outputs A and C are off, the magnetization reversal is not recorded at these forward and backward nearest magnetization reversal positions, and the peak shift phenomenon does not occur.

When looking at the time position T2, the outputs A and B are on and the output C is off. The output of AND circuit 23 only is turned on (3), and the signal is input to the write driver 37, being delayed by 2t at the delay circuit 34. This corresponds to the pre-shifting in the backward direction of time. In other words, the nearest magnetization reversal position in the backward direction of time has a magnetization reversal recorded, and the nearest magnetization reversal position in the forward direction of time does not have a magnetization reversal recorded, and the magnetization reversal to be recorded is shifted in the backward direction of time considering that the peak will shift toward the forward direction during reproduction.

When looking at the time position T3, all outputs A, B, and C are on, and the output of the AND circuit 24 (4) is on. In this case, the signal is input to the write driver 37, with being delayed by a delay time of t at the delay circuit 35. This corresponds to the pre-shift amount of zero. This means that, on either sides of the magnetization reversal to be recorded, magnetization reversals with the same time intervals are recorded, which eliminates the peak shift.

Looking at the time position T4, outputs B and C are on, and the output A is off. The output of the AND circuit 22 (2) is on, and the signal is input to the write driver 37 without any delay time. This corresponds to a pre-shifting in the forward direction of time. In this case, the nearest magnetization reversal position in the backward direction does not have any magnetization reversal recorded, but that in the forward direction has a magnetization reversal recorded. The magnetization reversal to be recorded is shifted in the forward direction of time, considering that the peak will shift in backward direction of time at the time of reproduction.

The above pre-shift circuit 1 sets the pre-shift amount through the delay circuits 34 and 35, and it can perform only one stage pre-shifting for each forward and backward direction of time. For example, in writing codes of 1-7 coding which includes

```
       10101
       101001
         .
         .
         .
       10100000001,
``` observing "1" at the third code bit of the writing code, i.e. the second magnetic reversal, the peak shift amount of each writing code differs from one another. For the writing code of the first line, pre-shift amount is zero. Moving downward, in the above list of writing codes, the peak shift amount becomes larger. The pre-shift circuit 1 of the first embodiment set the delay times 2t and t at the delay circuits 34 and 35 so that they completely compensate the peak shift of the writing code on the second line. Peak shifts of and after the third line cannot be completely compensated because of the difference in peak shift amounts, but about 60% of the entire amount can be compensated. Since the pre-shift amount is set to completely compensate the writing code on the second line with the smallest peak shift amount when excluding the first line, it is possible to avoid the peak level decline caused by a large pre-shift setting. The remaining 40% of the peak shift left in the recording process is to be compensated in the reproducing process.

As shown in FIG. 1, the reflection type cosine equalizer 5 consists of a delay circuit 51 with a delay time $\tau$ and a pair of gain adjustment circuits 52 and 53 with gains of $k_1$ and $k_2$, and a pair of differential amplifiers 54 and 55, and includes two equalizers commonly using the delay circuit 51. The delay circuit 51 can be provided separately for each equalizer.

The equalizer consisting of the delay circuit 51, the gain adjustment circuit 52, and the differential amplifier 54 is for the peak shift compensation adjustment. Since the peak shift compensation is performed for about 60% at the pre-shift circuit 1, the gain $k_1$ of the gain adjustment circuit 52 can be set at, for example about 0.2, a much smaller value than the gain rate of 0.6 for the case where the peak shift compensation is performed at the equalizer alone. This small setting of the gain rate prevents noises in the high frequency range from being excessively amplified at the output $f_1$ from the differential amplifier 54.

Meanwhile, the equalizer consisting of the delay circuit 51, the gain adjustment circuit 53 and the differential amplifier 55 is provided to generate the window signal WS used in the digital data reproducing circuit 6 described later. The gain rate $K_2$ of the gain adjustment circuit 53 is set at as large as about 0.7, for example, to avoid the peak level decline due to high recording frequency The output $f_2$ from the differential amplifier 55 is exclusively used to generate the window signal WS, and no problem occurs even when high frequency components are amplified a little, so the gain $k_2$ can be set at a high level.

As shown in FIG. 1, the digital data reproducing circuit 6 comprises a differentiation circuit 61 to differentiate the equalized signal $f_1$, a zero-cross comparator 62 to output the zero-cross signal ZCS by transferring the zero-cross points in the differentiation signal df, a window signal generating circuit 63 to generate the window signals WS1 and WS2 having two reversed phases by comparing the equalized signal $f_2$ with the predetermined slice level $V_{SL}$, and a data separator 64 to reproduce the data using window signals WS1, WS2, and zero-cross signal ZCS.

Figure 5:
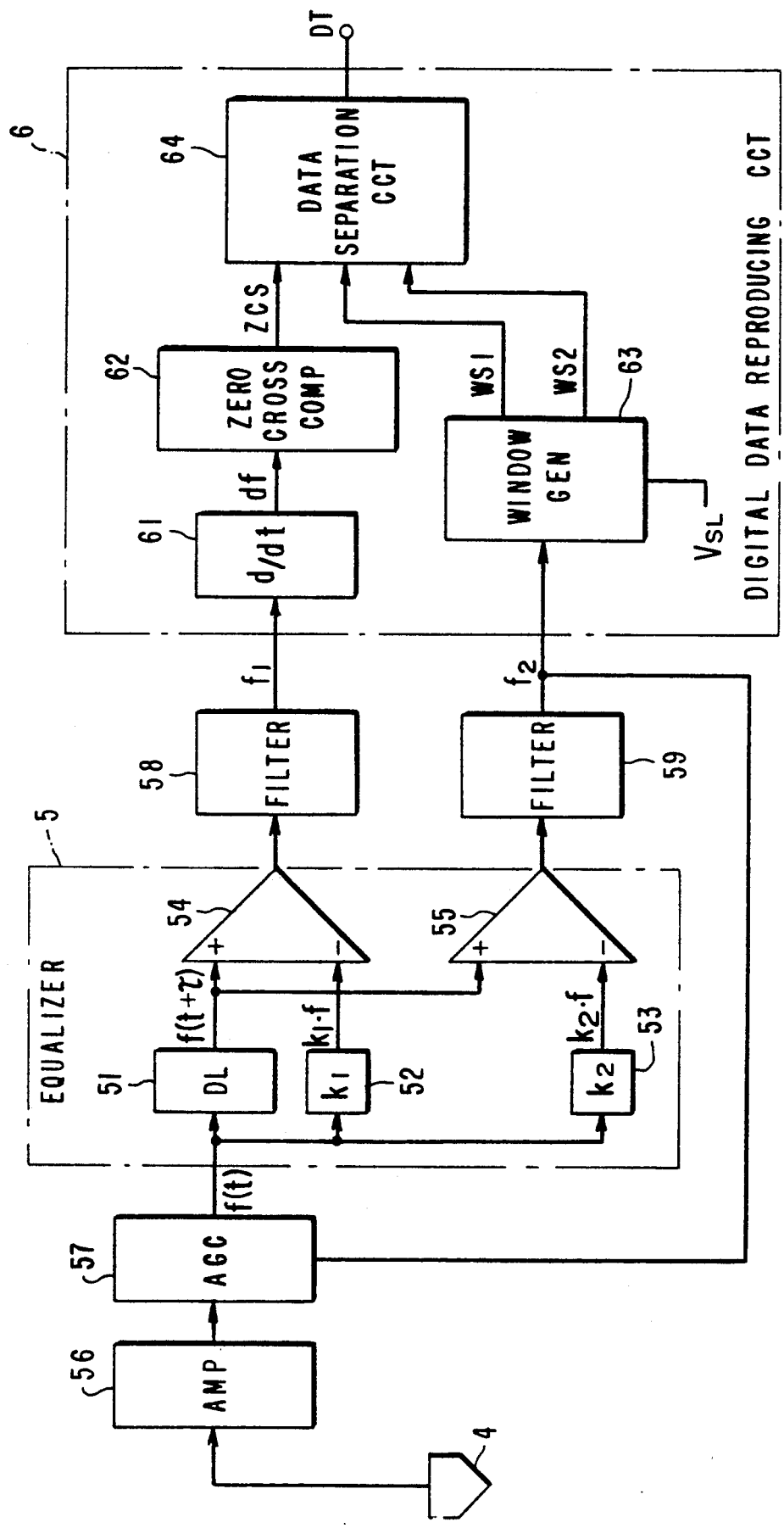
FIG. 5 shows another embodiment of the present invention.

FIG. 5 shows a construction when the data reproducing circuit of the first embodiment shown in FIG. 1 is applied, for example, to a magnetic disc device. In FIG. 5, the same reference numerals are used for the same constituents as in FIG. 1. The construction in FIG. 5 illustrates the part where the data is reproduced based on the received analog signal from the magnetic head 4. In FIG. 5, 56 is an amplifier to amplify the weak analog signal received by the magnetic head 4, 57 is an automatic gain adjustment circuit (AGC) to automatically control the gain for the amplified signal, and 58 and 59 are low pass filters to remove the high frequency noise component contained in the output of the differential amplifiers 54 and 55. The construction and details of each constituent shown in FIG. 5 are based on the art disclosed in the above mentioned U.S. patent application Ser. No. 07/323,943.

Figure 6:
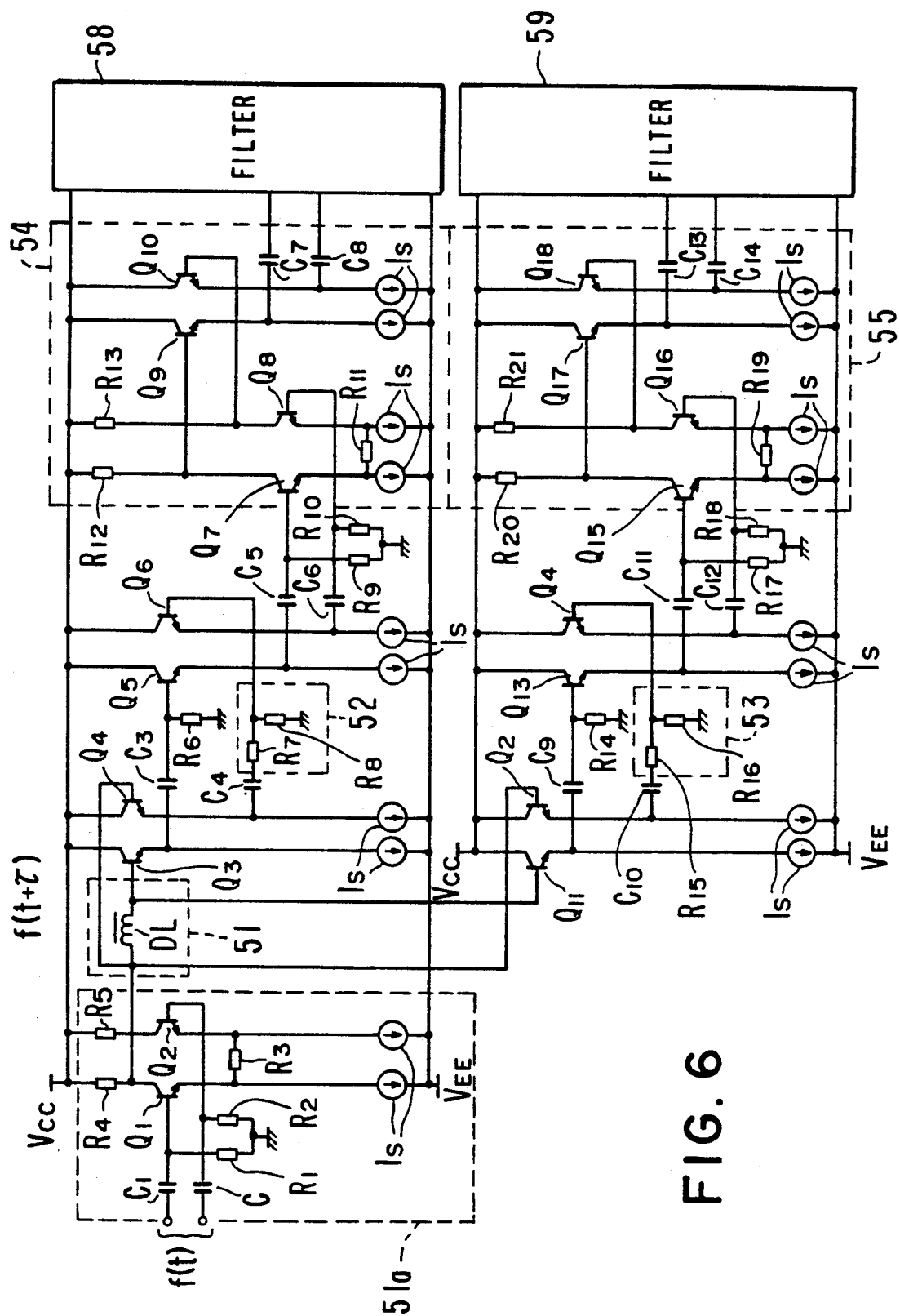
FIG. 6 is a schematic diagram to show the detailed construction of the equalizer in FIG. 5.
Figure 7A:
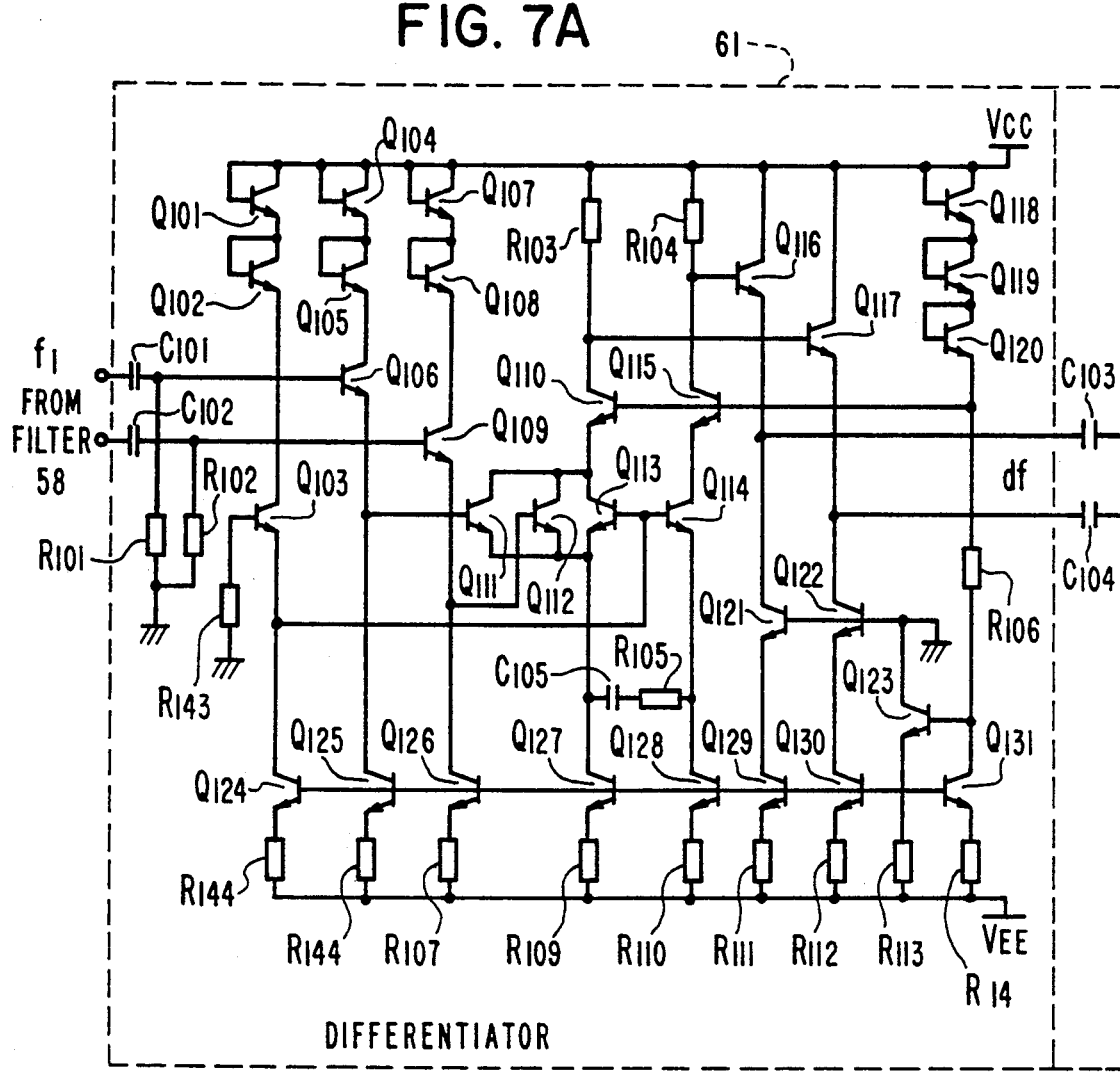

FIG. 6 is a circuit diagram of the reflection type cosine equalizer shown in FIG. 5, and FIG. 7A and 7B are circuit diagrams of the data reproducing circuit shown in FIG. 5.

In FIG. 6, reference numeral 51a denotes an input terminal circuit, which receives the analog input f(t), constitutes an open termination of a delay circuit 51. The input terminal circuit 51a comprises coupling capacitors $C_1$ and $C_2$ for receiving the analog signal f(t), a pair of emitter-follower transistors $Q_1$ and $Q_2$ constituting a differential amplifier, a coupling resistor $R_3$, collector resistors $R_4$ and $R_5$, and current sources Is. The collector resistors $R_4$ and $R_5$ serve as terminal resistors. Reference symbol DL denotes a delay line consisting of an inductor which delays the collector output from the transistor $Q_1$ by a delaying time $\tau$. The output of the delay line DL is connected to a pair of emitter-follower transistors $Q_3$ and $Q_4$, to increase an input impedance of the amplifier 54 to cause a reflection. An output $f(t+\tau)$ from the delay line DL is applied to the differential amplifier 54 through a transistor $Q_3$, a coupling capacitor $C_3$, a pull-down resistor $R_6$, a transistor $Q_5$, a coupling capacitor $C_5$, and a pull-down resistor $R_9$. An input to the delay line DL is also input to the first gain adjustment circuit 52 consisting of voltage-dividing resistors $R_7$ and $R_8$ which define the gain $k_1$ through the transistor $Q_4$ and the coupling capacitor $C_4$, and is then applied to the differential amplifier 54 through a transistor $Q_6$, a coupling capacitor $C_6$, and a pull-down resistor $R_{10}$. The differential amplifier 54 has a pair of differential transistors $Q_7$ and $Q_8$, a coupling resistor $R_{11}$, collector resistors $R_{12}$ and $R_{13}$, a pair of transistors $Q_9$ and $Q_{10}$ for outputting the collector output as the emitter output, and coupling capacitors $C_7$ and $C_8$ connected to the filter 58.

Similarly, the output $f(t+\tau)$ of the delay line DL is input to a transistor $Q_{11}$ to increase an input impedance of the amplifier 55 to cause a reflection, and is added to the differential amplifier 55 through a coupling capacitor $C_9$, a pull-down resistor $R_{14}$, a transistor $Q_{13}$, a coupling capacitor $C_{11}$, and a pull-down resistor $R_{17}$. The input to the delay line DL is also added to the second gain adjustment circuit 53 consisting of voltage-dividing resistors $R_{15}$ and $R_{16}$ which define the gain $k_2$ through a transistor $Q_{12}$ and a coupling capacitor $C_{11}$, and is then $Q_{14}$, a coupling capacitor $C_{12}$, and a pull-down resistor $R_{17}$. The differential amplifier 55 includes a pair of differential transistors $Q_{15}$ and $Q_{16}$, a coupling resistor $R_{19}$, collector resistors $R_{20}$ and $R_{21}$, a pair of transistors $Q_{17}$ and $Q_{18}$ for outputting the collector output as the emitter output, and coupling capacitors $C_{13}$ and $C_{14}$. The emitters of the emitter-follower transistors $Q_1$ to $Q_{18}$ are coupled to current sources Is, respectively.

In FIG. 7A, the differentiator 61 includes coupling capacitors $C_{101}$ and $C_{102}$ connected to the filter 58, a differential amplifier consisting of transistors $Q_{111}$, $Q_{112}$, $Q_{113}$, a differential circuit consisting of a capacitor $C_{105}$ and a resistor $R_{105}$, and output transistors $Q_{116}$ and $Q_{117}$. Transistors $Q_{101}$, $Q_{102}$, $Q_{104}$, $Q_{105}$, $Q_{107}$, $Q_{108}$, $Q_{118}$, $Q_{119}$, $Q_{120}$, an emitter of each which is connected to a base, function as diodes and function as level shifters. A plurality of series-connected circuits of transistors and resistors, for example, a transistor $Q_{124}$ and a resistor $R_{144}$, are current sources. The zero-cross comparator 62 includes coupling capacitors $C_{103}$ and $C_{104}$, a pair of voltage divider circuits, which consist of series-connected resistors $R_{116}$ and $R_{118}$, and $R_{117}$ and $R_{119}$, respectively, and three differential amplifiers; a first of which consists of a pair of differential operation transistors $Q_{133}$ and $Q_{134}$ and a pair of output transistors $Q_{135}$ and $Q_{136}$, a second of which consists of a pair of differential operation transistors $Q_{137}$ and $Q_{138}$ and a pair of output transistors $Q_{139}$ and $Q_{140}$, and a third of which consists of a pair of differential operation transistors $Q_{141}$ and $Q_{142}$ and a pair of output transistors $Q_{143}$ and $Q_{144}$. The window generating circuit 63 includes coupling capacitors $C_{106}$ and $C_{107}$, voltage dividing circuits which consists of series connected resistors $R_{139}$ and $R_{141}$, and $R_{140}$ and $R_{142}$, comparators CMP1 and CMP2 which operate in reverse to each other and generate the window signals WS1 and WS2, and a set-reset type flip-flop for outputting a third window signal WS3. The data separation circuit 64 includes a delay type flip-flop FF2, and a pulse generation circuit 431.

Figure 8:
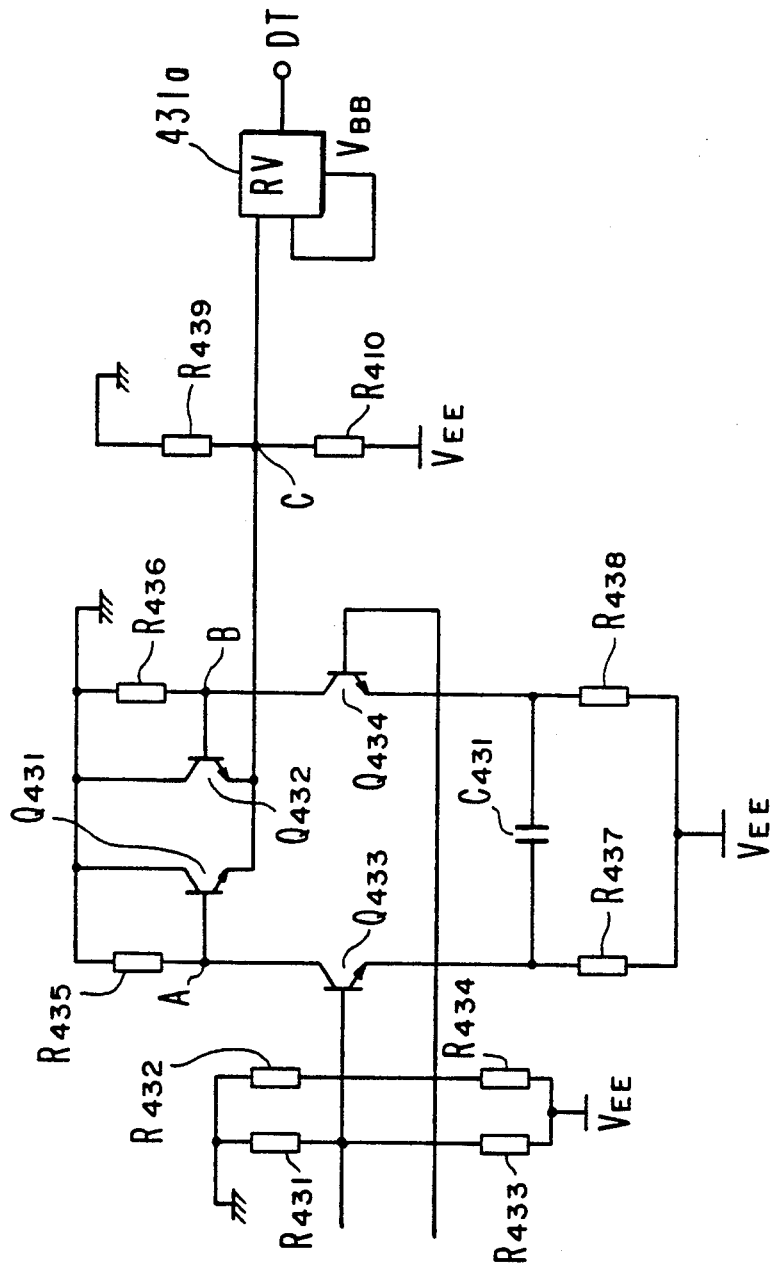
FIG. 8 is a diagram to show the detailed construction of the pulse generating circuit shown in FIG. 7.

FIG. 8 shows a circuit diagram of the pulse generation circuit 431. The pulse generation circuit 431 receives a pair of outputs DTA and DTA and generates the pulsed reproduction signal DT.

Figure 9:
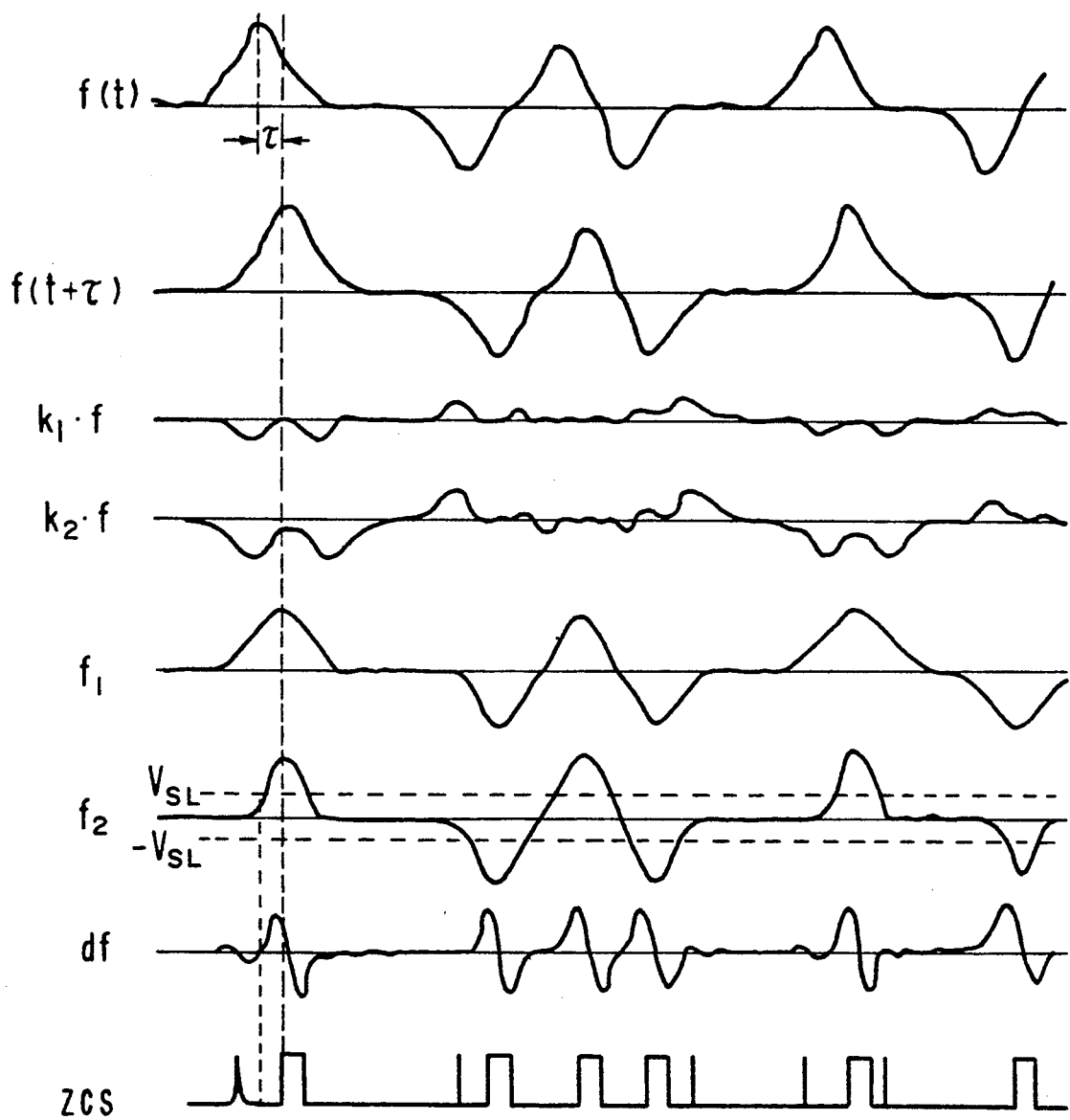
FIGS. 9 and 10 illustrate the waveforms of the circuits shown in FIGS. 5 to 8.
Figure 10:
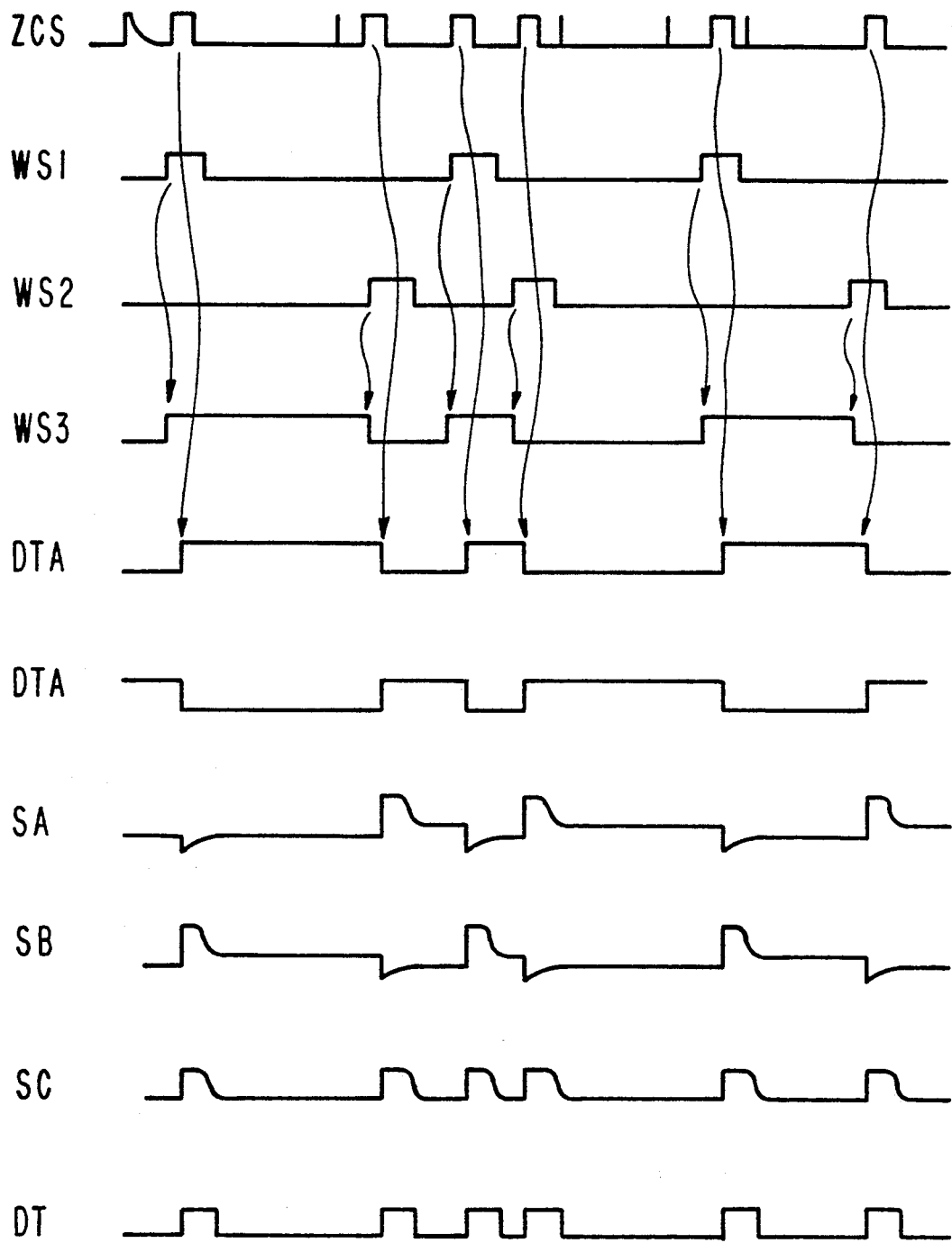

FIGS. 9 and 10 show waveforms to illustrate the operation at the equalizer 5 and the digital data reproducing circuit 6 of the first embodiment.

The received analog signal f(t) from the magnetic head 4 is input to the equalizer 5 and delayed at the delay circuit 51 by a delay time $\tau$, and sent to the positive terminal of the differentiation amplifier 54 as a delay signal $f(t+\tau)$. The gain adjustment circuit 52 receives the input signal f(t) and the delay signal $f(t+2\tau)$ (the delay signal $f(t+\tau)$ output from the delay circuit 51 reflected at the differential amplifier 54 and further delayed by the time $\tau$) and outputs the gain adjusted signal $k_1f(t)+k_1f(t+2\tau)$. The differential amplifier 54 outputs the equalized signal $f_1$ by having the gain adjusted signal $k_1f(t)+k_1f(t+2\tau)$ input to the negative terminal subtracted from the delay signal $f(t+\tau)$ input to the positive terminal.

Similarly, the gain adjustment circuit 53 outputs the gain adjusted signal $k_2f(t)+k_2f(t+2\tau)$. The differential amplifier 55 outputs the equalized signal $f_2$ by having the gain adjusted signal $k_2f(t)+k_2f(t+2\tau)$ input to the negative terminal subtracted from the delay signal $f(t+\tau)$ input to the positive terminal.

One of the equalized signals $f_1$ is input to the differentiation circuit 61 in the digital data reproducing circuit 6. The differentiation circuit 61 differentiates the equalized signal $f_1$, and the zero-cross comparator 62 detects the zero-cross points of the differentiation signal df and supplies the zero-cross signal ZCS to the data separation circuit 64. The other equalized signal $f_2$ is input to the window generating circuit 63 of the digital data reproducing circuit 6. The window generating circuit 63 generates the window signals WS1 and WS2 from the equalized signal $f_2$ to be supplied to the data separation circuit 64. By using the equalized signal $f_1$ with a large equalizing gain $k_1$, a signal with high S/N ratio can be differentiated, which enables the compensation of about 40% of the peak shift not compensated in the recording process. By using the equalized signal $f_2$ with a small equalizing gain $k_2$, the peak level at magnetization reversals can be maintained at almost the same level, and a good window signal can be generated. Thus, the fixed slice level $V_{SL}$ for window signal generation can be set high, without the possibility that the noises due to medium defects or otherwise exceeds the fixed slice level $V_{SL}$, and a good window signal WS can be obtained. This method eliminates the need of consideration of the S/N ratio for window generation, which has hithertofore been a major problems in the generation of window signals WS1 and WS2.

In the above embodiment, the two window signals WS1 and WS2 are generated, but the equalized signal $f_2$ is full-wave rectified and is sliced at one slice level $V_{SL}$, to form one window signal WS3 for data separation.

In FIG. 10, signals SA to SC show waveforms at nodes A, B and C in the pulse generation circuit shown in FIG. 8.

The digital data reproducing circuit 6 may be arranged such that the differentiator is operated by the window signal, and the equalized signal $f_1$ is differentiated and input to the zero-cross comparator 62 only during a window period, to reproduce data.

As described above, according to the present invention, since two equalized signals having different equalizing values are generated and used for differentiation and window generation, respectively, a differentiation with a high S/N ratio can be obtained and a window signal free from an influence of medium defects can be generated. Thus a reproduction free from an erroneous operation caused by medium defects can be realized.

In addition, an improved differentiator for differentiating an analog data exceeding a predetermined slice level will be described.

Figure 11:
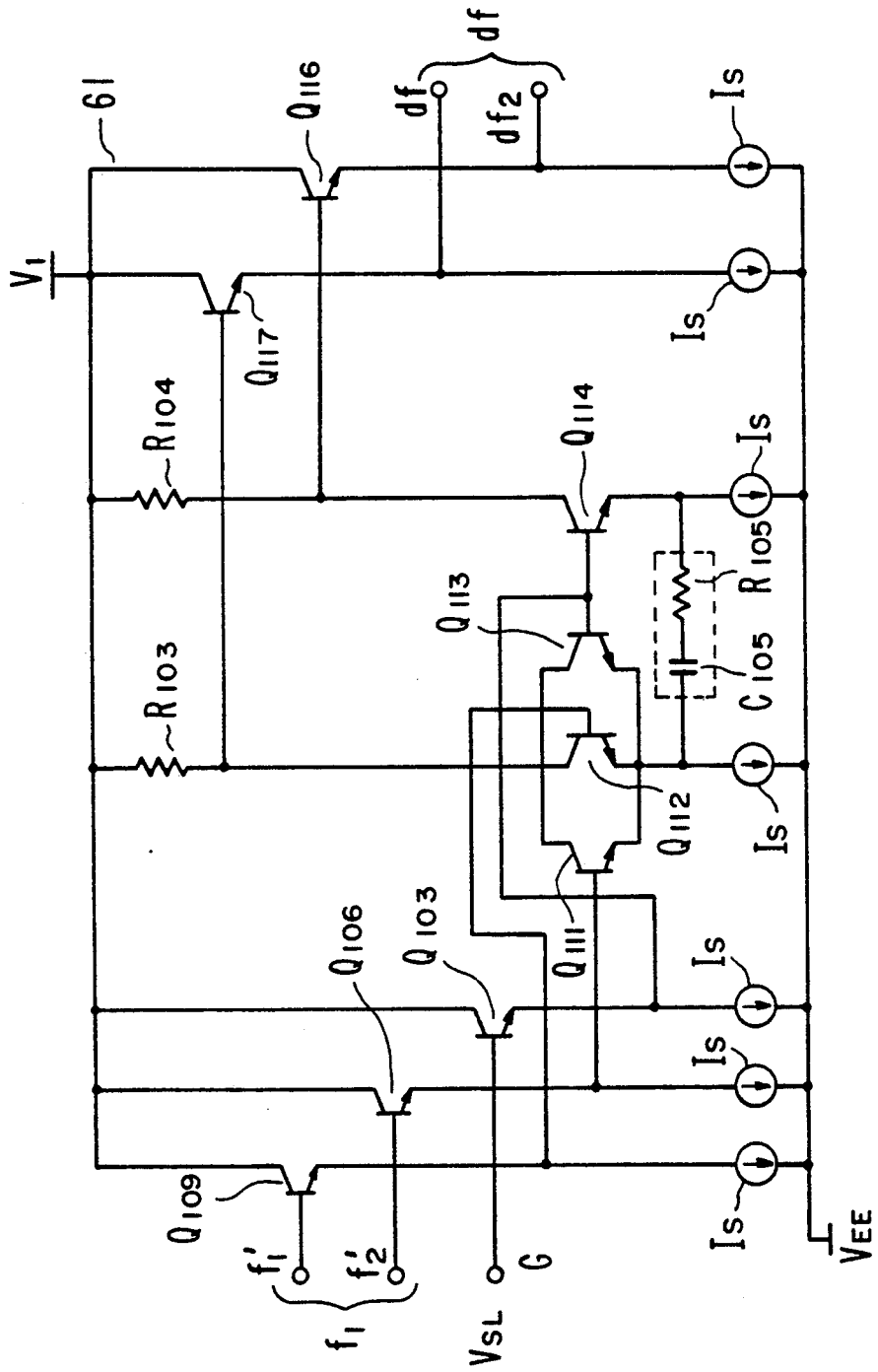
FIG. 11 is a diagram to show a simplified construction of the differentiation circuit shown in FIG. 7.

FIG. 11 is a simplified circuit diagram of the differentiator 61 shown in FIG. 7. Note that this differentiator 61 is a rectification active type differentiator.

Figure 12:
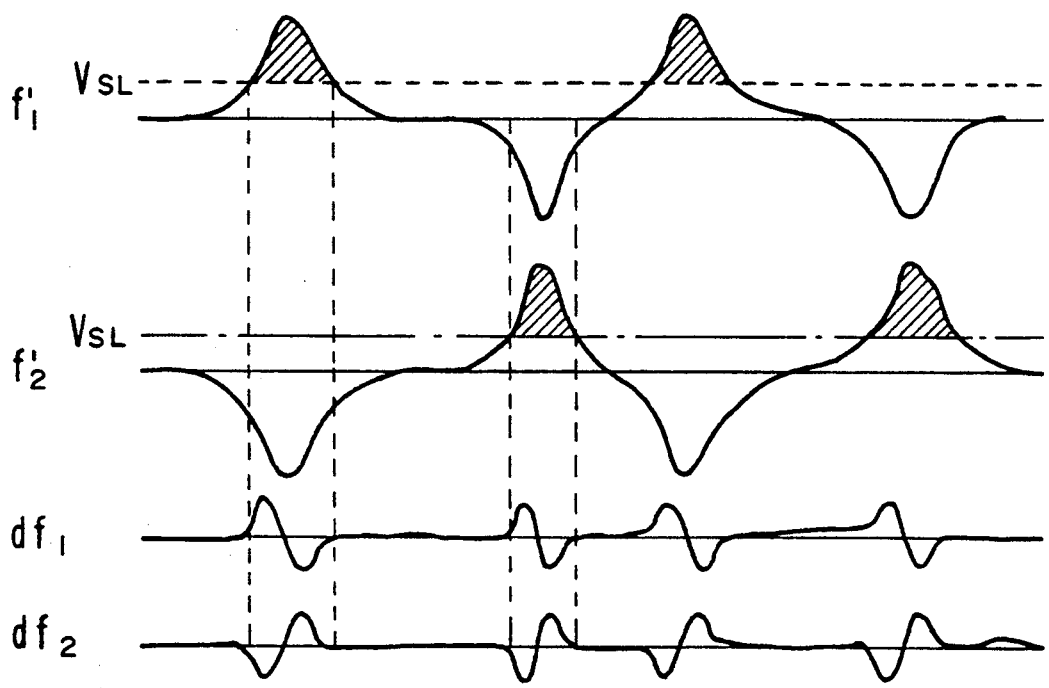
FIG. 12 illustrates the waveform of the differentiation circuit shown in FIG. 11.

FIG. 12 shows waveforms in the differentiator 61 shown in FIG. 11.

When the differential analog signal $f'_1$ or $f'_2$ exceeds the slice voltage $V_{SL}$, a current corresponding to a difference between the transistors $Q_{112}$ and $Q_{114}$, or $Q_{111}$ and $Q_{114}$ flows in the capacitor $C_{105}$ and through the resistor $R_{105}$ of the differentiating circuit, to thus achieve a differentiation. Therefore, the differentiation cannot be made for a noise component below the slice voltage $V_{SL}$, and thus a noise component can be removed, and a differentiation can be made for only a regular signal.

Figure 13:
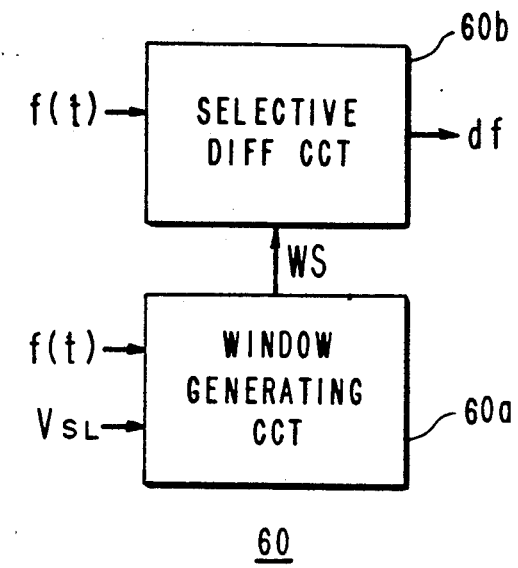
FIG. 13 shows a basic construction of the differentiation circuit used in another embodiment of the present invention.

FIG. 13 is a principle view of a differentiator 60 in accordance with the present invention.

In FIG. 13, the differentiator of the present invention has a window generating circuit 60a for slicing the analog signal f(t) at a predetermined slice level $V_{SL}$ to generate a window signal WS, and a selective differentiation circuit 60b for receiving the analog signal f(t) and differentiating the analog signal exceeding a level signal input to the gate terminal thereof. The window signal WS is supplied to the gate terminal of the selective differentiating circuit 60b.

Figure 14:
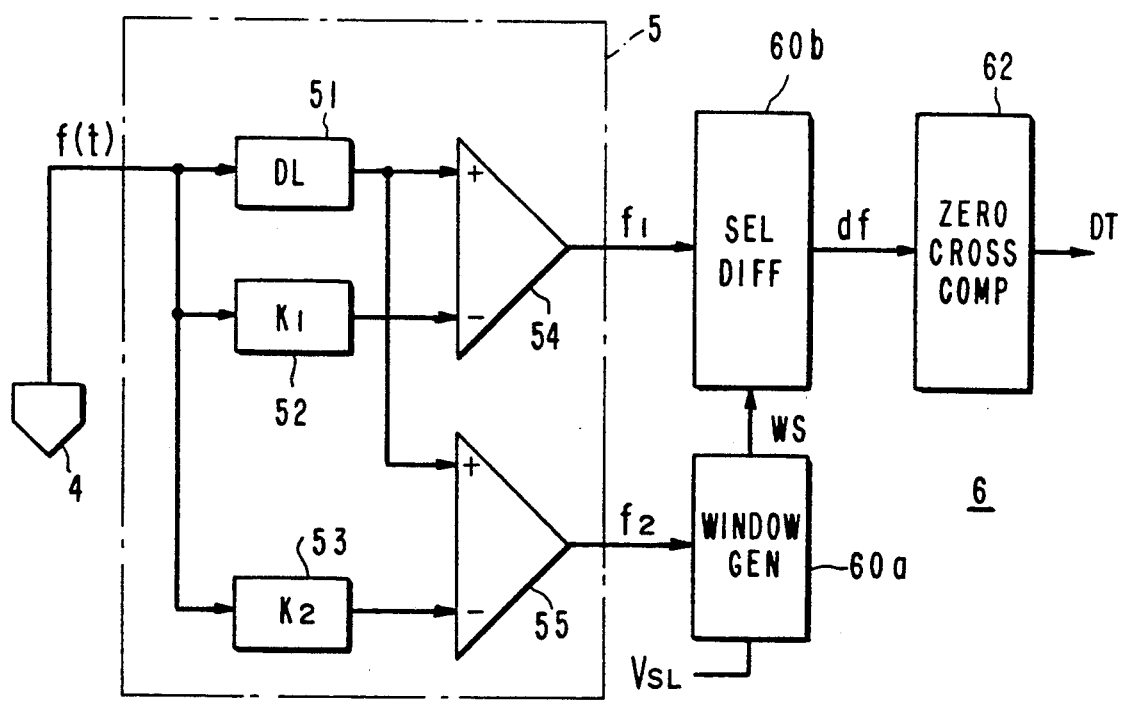
FIG. 14 shows the construction of another embodiment using the differentiation circuit shown in FIG. 13.

As shown in FIG. 14, a data reproducing circuit of the present invention has the reflection type cosine equalizer 5 having the same circuit construction as that shown in FIG. 1, for outputting the pair of equalized signals $f_1$ and $f_2$, the window generating circuit 60a for slicing one $f_2$ of the pair of equalized signals at the predetermined slice level $V_{SL}$ to generate a window signal WS, the selective differentiating circuit 60b for receiving the other $f_1$ of the pair of equalized signals and equalizing the equalized signal $f_1$ exceeding the window signal WS input to the gate terminal. The data reproducing circuit of the present invention also has zero-cross comparator 62 for obtaining a digital reproduction signal DT from the output from the selective differentiating circuit 60b. A digital data reproducing circuit 6 consists of the selective differentiating circuit 60b, the window generating circuit 60a, and the zero-cross comparator 64.

Figure 15:
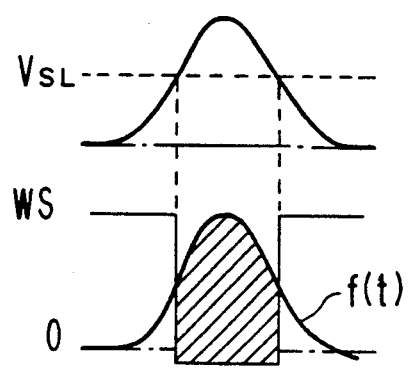
FIG. 15 illustrates the waveform of the differentiation circuit shown in FIG. 13.

As shown in FIG. 15, in the differentiator 60 of the present invention, the input analog signal f(t) and the slice level $V_{SL}$ are compared to generate the window signal WS, and the window signal WS is added to the selective differentiating circuit 60b as a level signal. The window signal WS is at a low level when the analog signal f(t) exceeds the slice level $V_{SL}$, and is high level when the signal f(t) does not exceed the slice level. The level itself of the analog signal f(t) can be differentiated, and a differentiation gain can be increased.

In the data reproducing circuit of the present invention, the reflection type cosine equalizer 5 generates the two equalized signals $f_1$ and $f_2$ having different gains $k_1$ and $k_2$, and the digital data reproducing circuit 6 can use the equalized signals $f_1$ and $f_2$ having the different equalizing gains $k_1$ and $k_2$ for differentiation and window generation, respectively.

Figure 16:
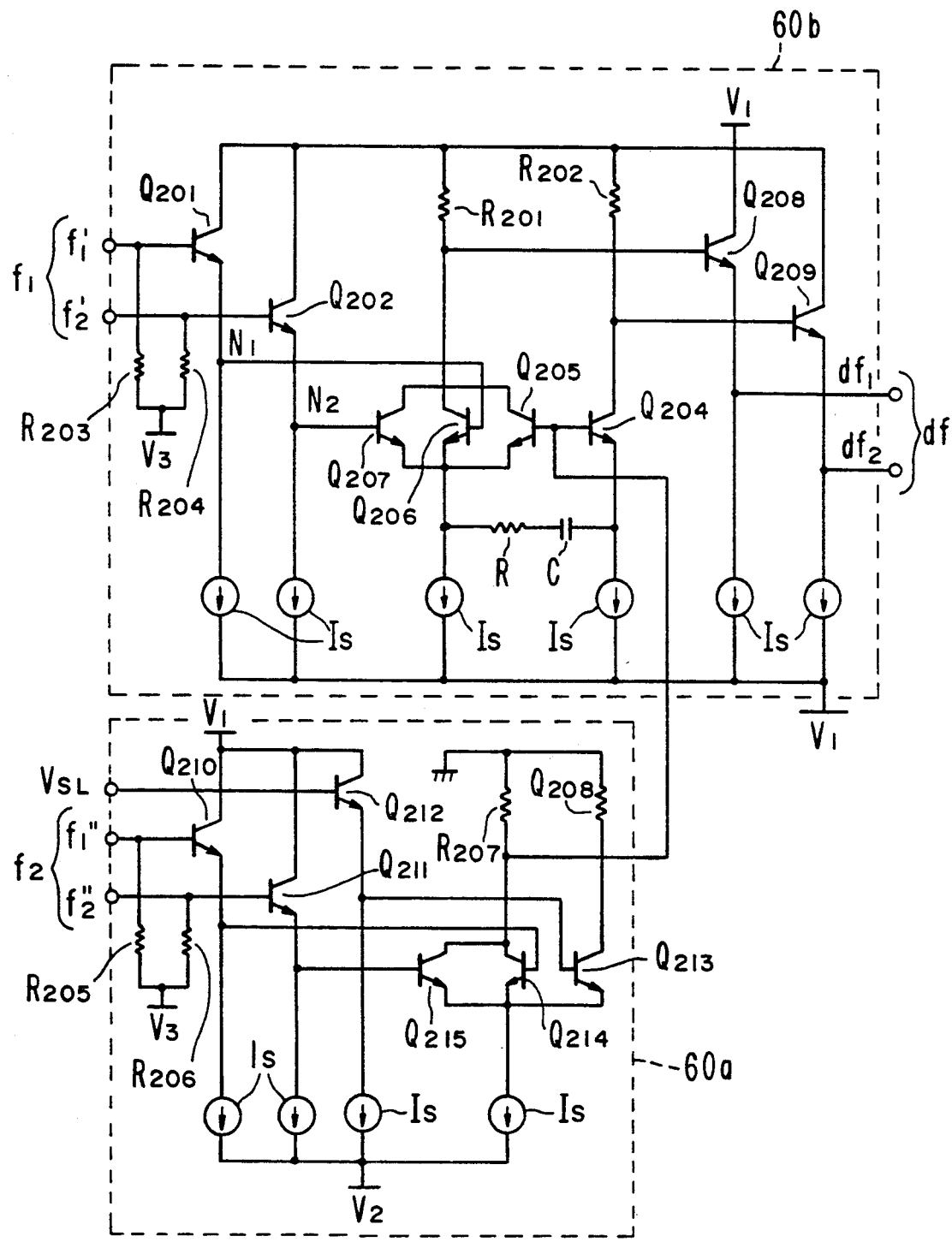
FIG. 16 is a diagram to shown the detailed construction of the differentiation circuit shown in FIGS. 13 and 14.

FIG. 16 is a view showing a circuit of the differentiator 60 according to an embodiment of the present invention.

The window generating circuit 60a has input resistors $R_{205}$ and $R_{206}$ and input transistors $Q_{210}$ and $Q_{211}$ for receiving the analog signals $f''_1$ and $f''_2$, an input transistor $Q_{212}$ for receiving the slice voltage $V_{SL}$, and a rectification differential amplifier consisting of transistors $Q_{213}$, $Q_{214}$, and $Q_{215}$. Reference symbols $R_{207}$ and $R_{208}$ denote collector resistors and Is denotes current sources.

A selective differentiating circuit 60b is similar to the differentiating circuit shown in FIG. 9 except that different reference numerals are used, and it is a rectification active type differentiating circuit in which the window signal WS is input to the gate terminal thereof, instead of the slice voltage $V_{SL}$.

Figure 17:
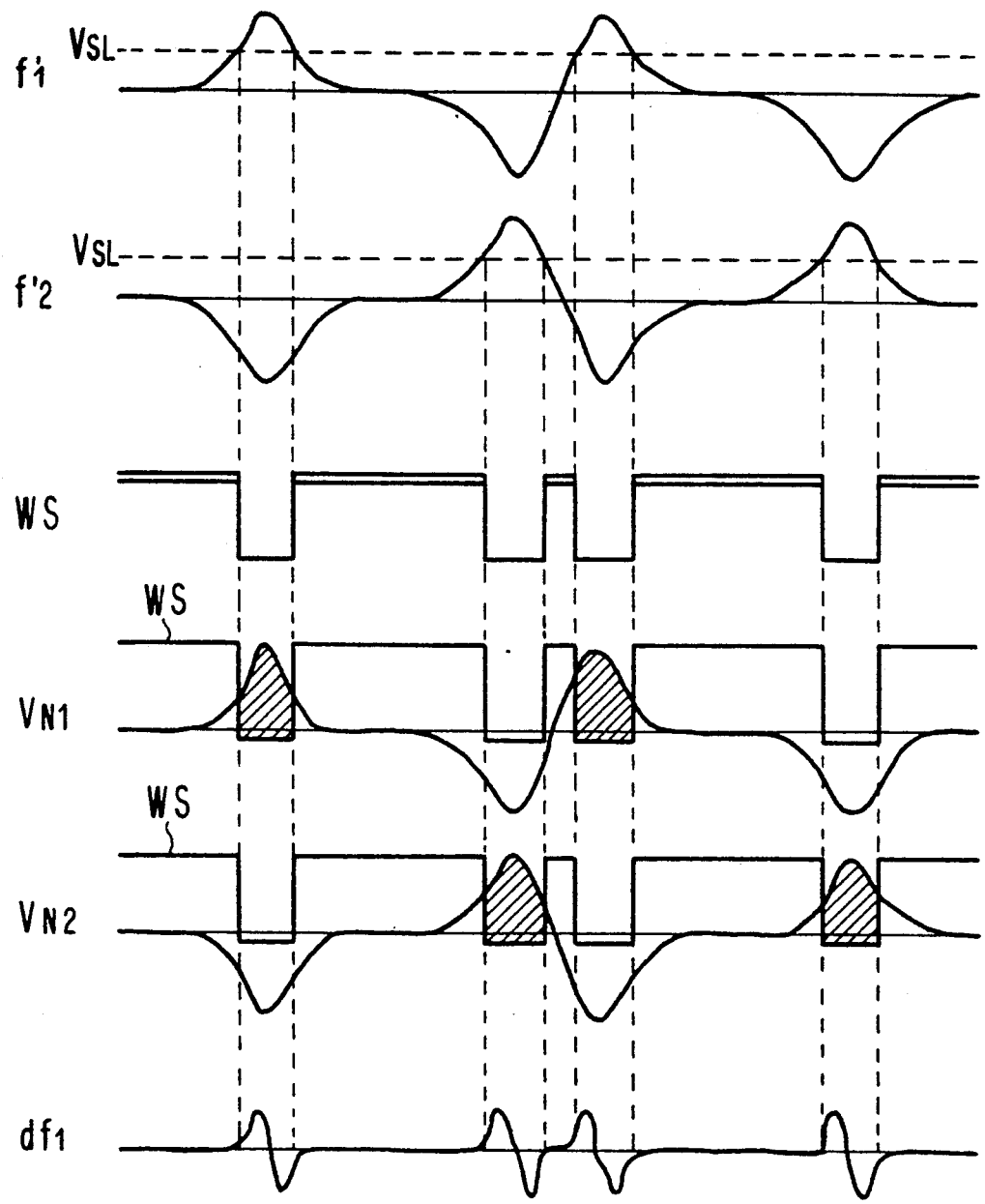
FIG. 17 illustrates the waveform of the differentiation circuit shown in FIG. 16.

FIG. 17 is a view for explaining an operation of the differentiator 60 shown in FIG. 16.

In the window generating circuit 60a, one analog input signal $f''_1$ is supplied to the base of the transistor $Q_{214}$ through the transistor $Q_{210}$, and the other analog input signal $f''_2$ is supplied to a base of the transistor $fQ_{215}$ through the transistor $Q_{211}$. Since a base of the transistor $Q_{213}$ receives the slice voltage $V_{SL}$ through the transistor $Q_{212}$, a rectification difference is obtained, and thus, when $f''_1 \geq V_{SL}$, or $f''_2 \geq V_{SL}$, the window signal WS is set at a low level; in another case, the window signal WS is set at a high level. In the selective differentiating circuit 60b, the analog signal $f'_1$ is supplied to a base of the transistor $Q_{206}$ through the transistor $Q_{201}$, and the analog signal $f'_2$ is supplied to a base of the transistor $Q_{207}$ through the transistor $Q_{202}$. Since bases of the transistors $Q_{204}$ and $Q_{205}$ receive the window signal WS, a current corresponding to a difference between the analog signals $f'_1$ and $f'_2$ and the low-level window signal WS flows through the differentiation resistor R and the capacitor C due to the rectification difference.

In FIG. 17, references $V_{N1}$ and $V_{N2}$ denote voltages at nodes N1 and N2.

Therefore, a differentiation is made at hatched portions in FIG. 17, and the differentiated signal is output through the output transistors $Q_{208}$ and $Q_{209}$. Accordingly, the differentiation gain can be increased, and the S/N ratio of a signal can be raised.

Figure 18:
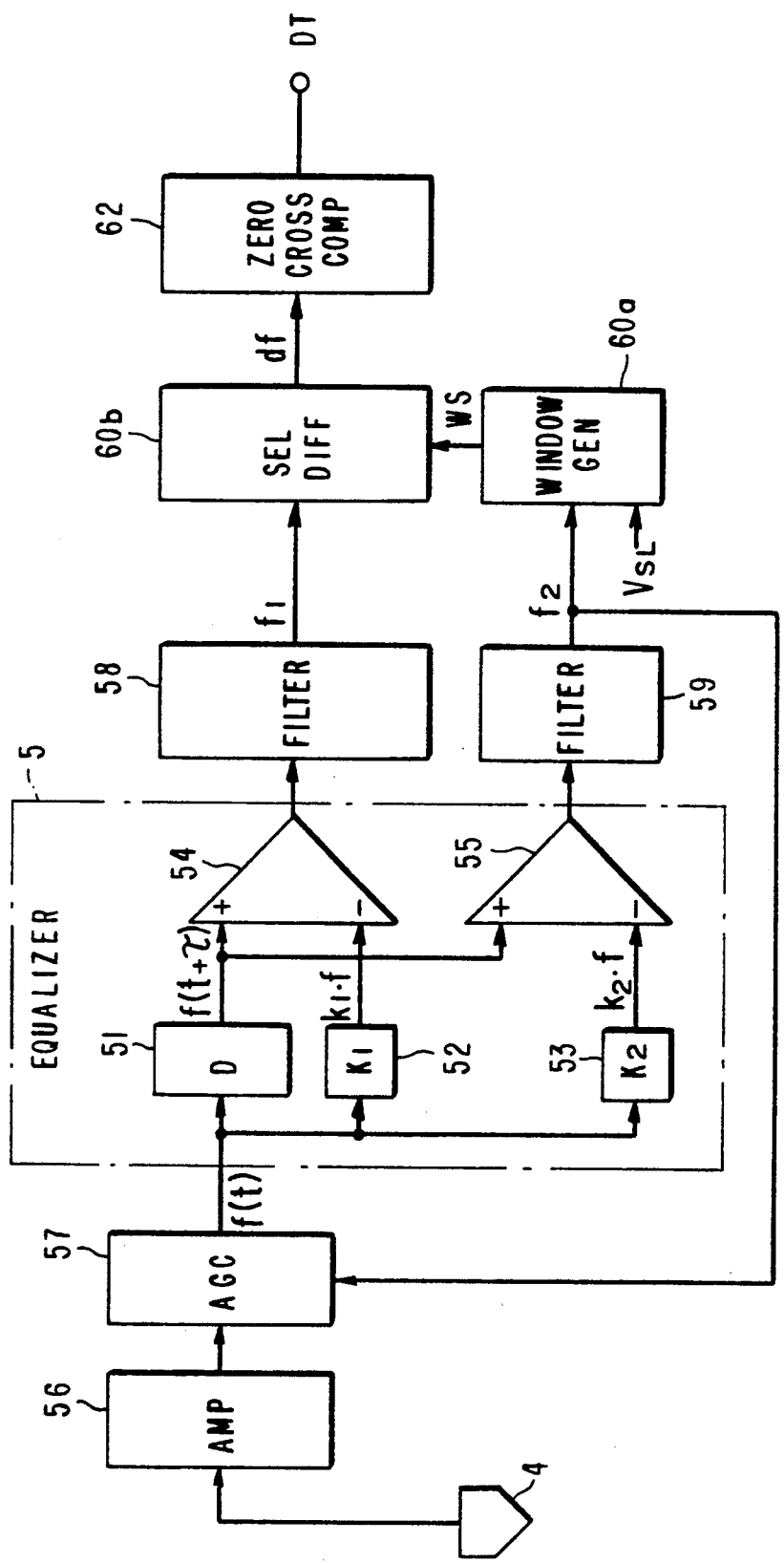
FIG. 18 shows the construction of another embodiment of the present invention.
Figure 19:
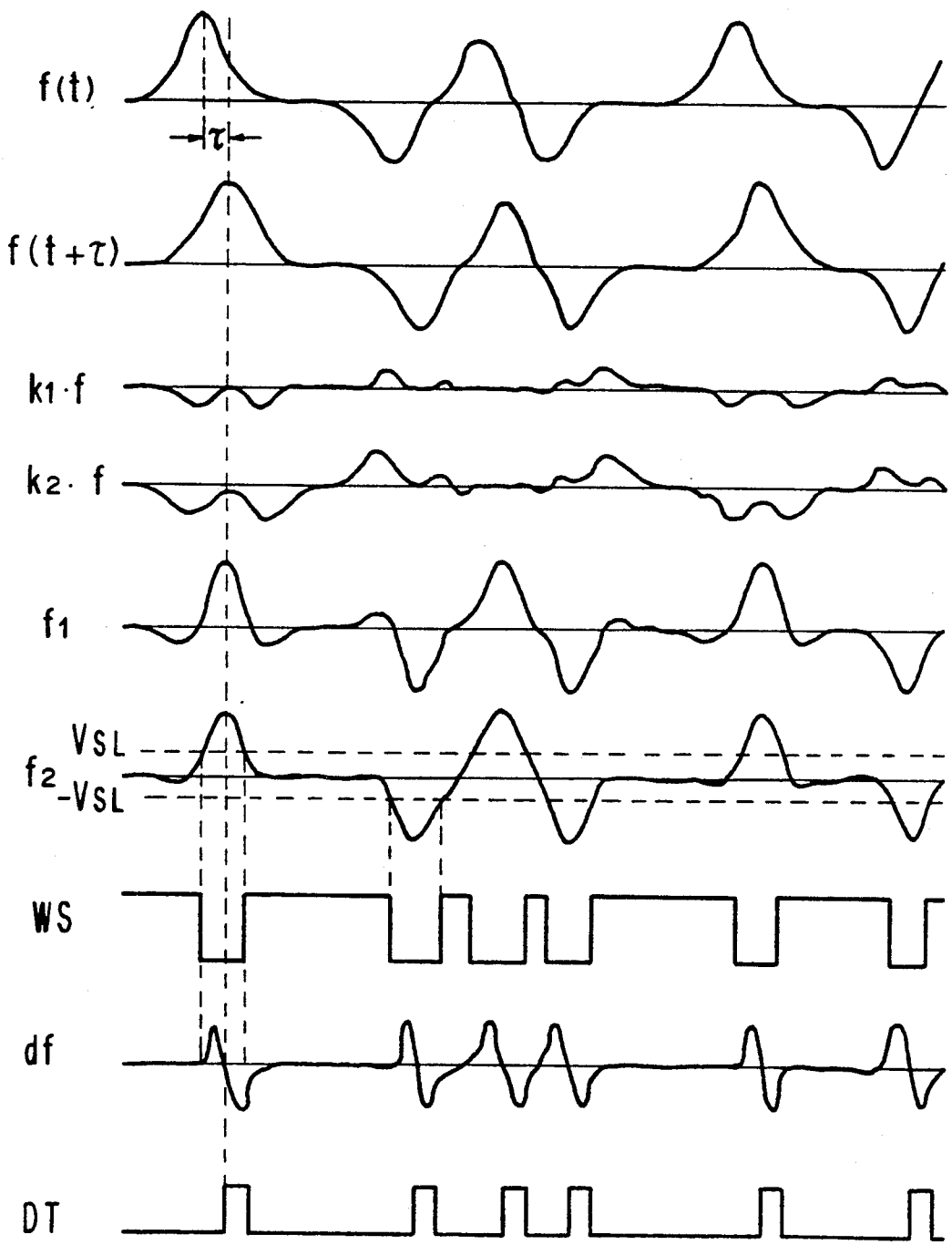
FIG. 19 illustrates the waveform of the embodiment shown in FIG. 18.

FIG. 18 shows the construction of an embodiment where the data reproducing the circuit illustrated in FIG. 14 is applied, for example, to a magnetic disc device. FIG. 19 illustrates the waveforms of this embodiment.

The output from the magnetic head 4 is amplified by the amplifier 56, is AGC-controlled by the AGC circuit 57, and is then supplied to the reflection type cosine equalizer 5. The analog input is delayed by the delay time $\tau$ at the delay circuit 51 to be converted to a delay signal $f(t+\tau)$. The first gain adjustment circuit 52 outputs the first gain adjusted signal $k_1 \cdot f$ having the small gain $k_1$ and the second gain adjustment circuit 53 outputs the second gain adjusted signal $k_2 \cdot f$ with the large gain $k_2$.

The equalized signal $f_2$ is rectified and compared with the slice voltage $V_{SL}$ by the window signal generating circuit 60a, thus generating the window signal WS. The equalized signal $f_1$ is supplied to the selective differentiating circuit 60b, and is differentiated while gating the window signal WS.

The differentiated signal df is zero-cross detected by the zero-cross comparator 62, to thus obtain the reproduction signal DT. In this case, since the equalized signal $f_1$ has a sharp waveform, the S/N ratio of the differentiated output is raised, and a good zero-cross output can be obtained.

In the above embodiment, the rectification differentiating circuit 60b is used, but if a full-wave rectifier circuit is arranged at an input side, the differentiating circuit does not need a rectification function. Similarly, if a full-wave rectifier circuit is arranged at an input side of the window generating circuit, a rectification function is not needed.

The application of the differentiator is not limited to the magnetic reproducing circuit. For example, the differentiator can be applied to other circuits if a noise component below a predetermined level is to be removed.

An embodiment where the peak shift is compensated considering negative edges generated when using a thin film magnetic head is described below.

Figure 20:
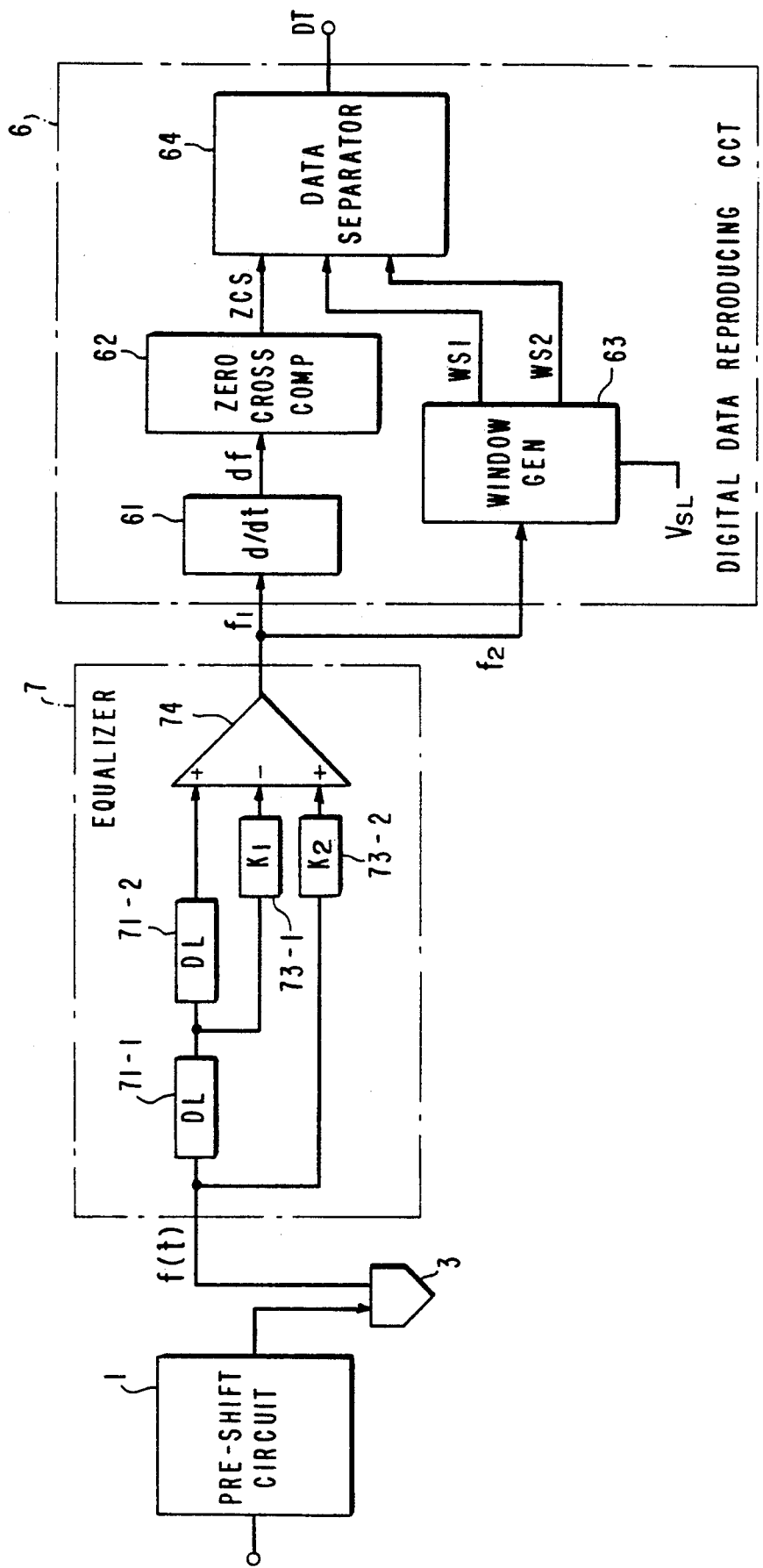
FIG. 20 shows the construction of another embodiment of the present invention.

FIG. 20 shows the basic construction of another embodiment of the present invention. In this figure, the data reproducing circuit of the present embodiment consists of a pre-shift circuit 1, the magnetic head 3, the equalizer 7 and the digital data reproducing circuit 6. In FIG. 20, the same reference numerals as in FIG. 1 indicate the same constituents. The peak shift compensation in the reproducing process in the present embodiment utilizes the techniques disclosed in the Japanese Patent Application Laid-open Print No. 61-99906 and U.S. patent application claiming priority under the Paris Convention based on the Japanese Patent Application No. 1-21315 by Toshiki Kimura.

The magnetic head 3 contains negative edges in the received analog signals, and is constructed with a thin film magnetic head.

The equalizer 7 consists of a first delay circuit 71-1 with the delay time of $\tau 1$, a second delay circuit 71-2 with the delay time of $\tau 2$, a first gain adjustment circuit 73-1 with the gain k1, a second gain adjustment circuit 73-2 with the gain k2, and the differential amplifier 74 including two positive terminals and a negative terminal.

The analog signal f(t) input from the magnetic head 3 to the equalizer 7 is input to the first positive terminal of the differential amplifier 74 through the two delay circuits 71-1 and 71-2. The analog signal f(t) is input to the second positive terminal of the differential amplifier 74 through the second gain adjustment circuit 73-2. The output from the first delay circuit 71-1 is input to the negative terminal of the differential amplifier 74 through the first gain adjustment circuit 73-1. The output of the differential amplifier 74 is supplied to the differentiation circuit 61 of the digital data reproducing circuit 6 as the equalized signal $f_1$, and on the other hand supplied to the window generating circuit 63 in the digital data reproducing circuit 6 as the equalized signal $f_2$.

Figure 21:
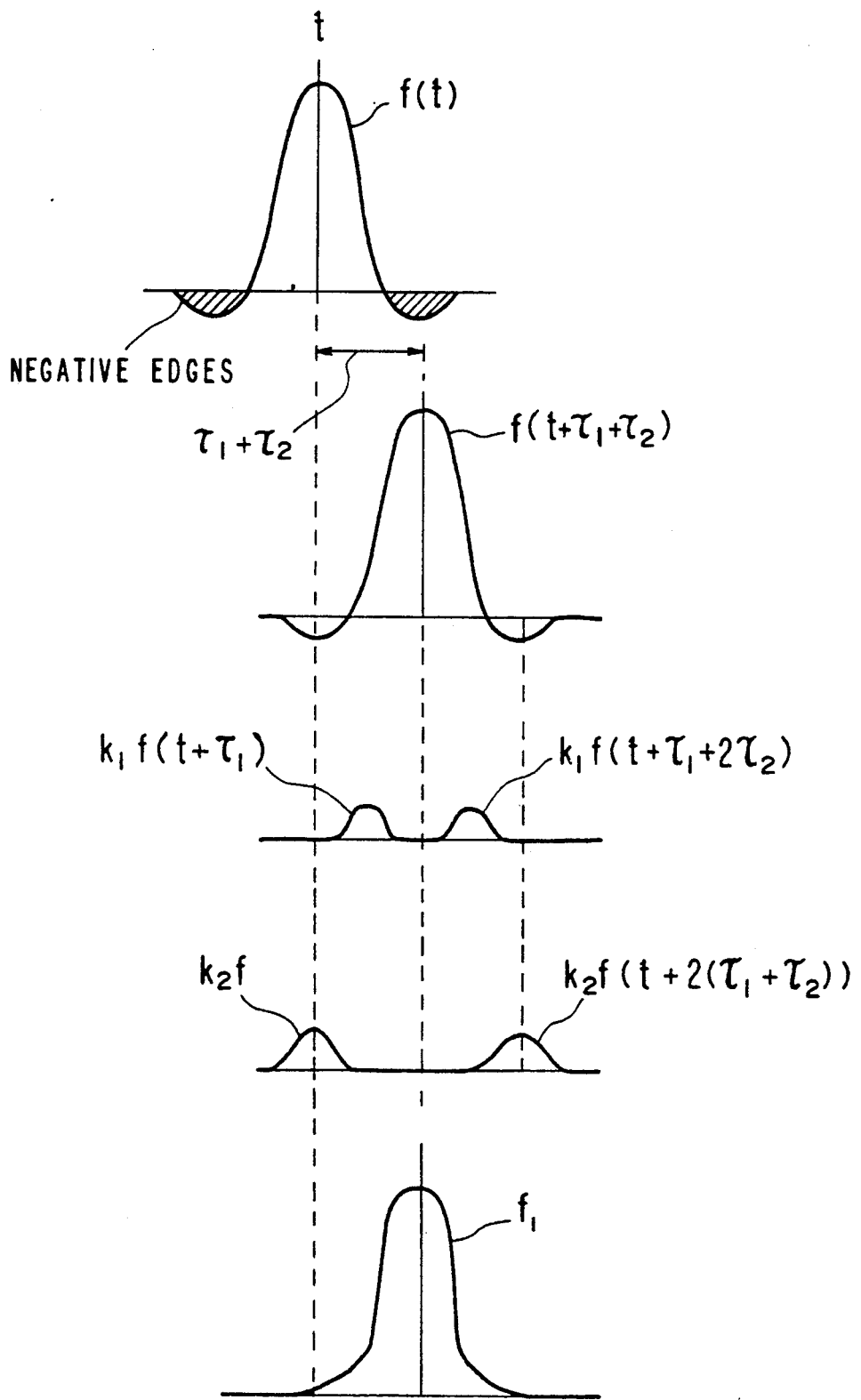
FIG. 21 illustrates the waveform of the embodiment shown in FIG. 20.

FIG. 21 illustrates the signal waveform of the circuit shown in FIG. 20.

As shown in FIG. 21, the received analog signal f(t) from the magnetic head 3 contains negative edges. The signal f(t) passes the first delay circuit 71-1 (delay time $\tau 1$) and the second delay circuit 71-2 (delay time $\tau 2$), and is input to the first positive terminal in the differential amplifier 74. This signal will be referred to as $f(t+\tau_1+\tau_2)$. At this point, extremely large input impedance of the differential amplifier 74 causes the signal $f(t+\tau_1+\tau_2)$ to be reflected, which produces the reflected signal.

The output of the delay circuit 71-1 (with a delay of $\tau_1$) and the above mentioned reflected signal reflected at the delay circuit 71-2 (with a delay of $\tau_1+2\tau_2$) pass through the first gain adjustment circuit (gain rate: $K_1$) 73-1, and are input to the negative terminal of the differential amplifier 74. These signals will be referred to as $k_1 f(t+\tau_1)$ and $K_1 f(t+\tau_1+2\tau_2)$.

The signal f(t) and the above mentioned reflected signals reflected at the delay circuits 71-1 and 71-2 (with a delay of 2 $(\tau_1+\tau_2)$) pass the second gain adjustment circuit (gain rate: $K_2$) 73-2, and are input to the second positive terminal of the differential amplifier 74. These signals will be referred to as $K_2 f(t)$ and $K_2 f(t+2(\tau_1+\tau_2))$ Considering the fact that the signal $f(t+\tau 1+\tau 2)$, signal $k_2 f(t)$ and $K_2 f(t+2(\tau 1+\tau 2))$ are added at the differentiation amplifier 74, by properly setting the delay time $\tau 1$ and $\tau 2$ and the gain rate $K_2$, negative edges in the signal $f(t+\tau 1+\tau 2)$ can be eliminated by the addition of the signal $K_2 f(t)$ and others. The signal after eliminating the negative edges is referred to as the equalized output $f_1$ of the differential amplifier 74 ($=f_2$). Consequently, the negative edges can be disregarded at the digital data reproducing circuit 6. In addition, negative edges are not detected as excessive peaks at the differentiation process.

The subtraction of the signals $K_1 f(t+\tau 1)$ and $K_1 f(t+\tau 1+2\tau 2)$ at the differential amplifier, by properly setting the delay time $\tau 1$ and $\tau 2$ and the gain rate $K_1$, allows the signal $f(t+\tau 1+\tau 2)$ without negative edges to be made sharper by subtraction of the signal $K_1 f(t+1)$ and others.

Therefore, sharing of the peak shift compensation by the pre-shift circuit 1 and the equalizer 7 realizes a sufficient peak shift compensation. With the peak shift compensation sharing, in particular, pre-shift amounts can be moderately set in the pre-shift circuit 1 to reduce the decline of the peak level; and in the equalizer 7, the equalizing amount can be set at a low level, so that the amplification of the noise components in the high frequency range can be reduced and shoulders in the equalized signals can be made to a low level. These measures above realize the negative edge elimination and a good peak shift compensation.

Figure 22:
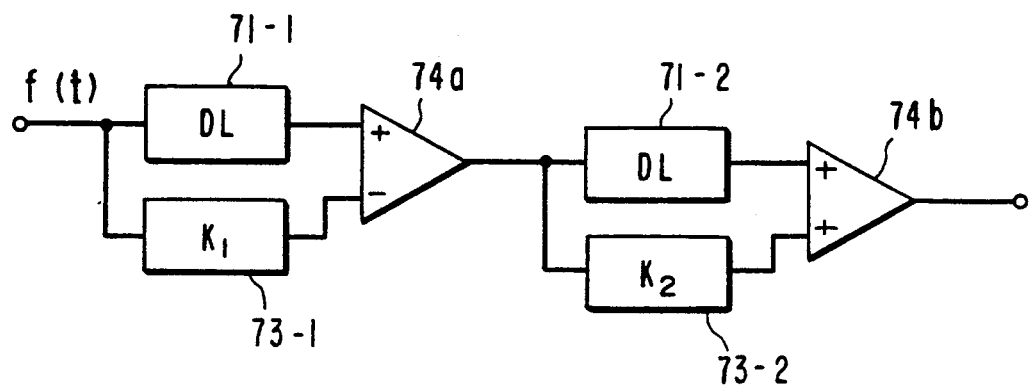
FIGS. 22 and 23 shows the construction of another embodiment of the present invention.

FIG. 22 shows another construction embodiment of the equalizer 7 in FIG. 20. The equalizer shown in FIG. 22 consists of two delay circuits 71-1 and 71-2, two gain adjustment circuits 73-1 and 73-2, a differential amplifier 74a, and an addition amplifier 74b. In this embodiment, the differential amplifier 74 including two positive terminals and a negative terminal is formed by the differential amplifier 74a with two inputs and the addition amplifier 74b with two inputs.

The received analog signal f(t) from the magnetic head 3 is input to the positive terminal of the differential amplifier 74a through the delay circuit 71-1 with the delay time $\tau 1$. The reflected signal from the differential amplifier 74a through the delay circuit 71-1 and the received analog signal f(t) are input to the negative terminal of the differential amplifier 74a through the gain adjustment circuit 73-1 with the gain $k_1$. The differential amplifier 74a realizes the peak shift compensation in the reproducing process, by having the signal input to the negative terminal subtracted from the signal input to the positive terminal.

The equalized signal thus output from the differential amplifier 74a contains negative edges. The equalized signal is input to the first input terminal of the addition amplifier 74b through the delay circuit 71-2 with delay time of $\tau 2$. The reflected signal from the addition amplifier 74a is reflected backthrough the delay circuit 71-2 and the equalized signal output from the differential amplifier 74a are input through the gain adjustment circuit 73-2 with the gain rate of k2 to the second input terminal of the addition amplifier 74b. The addition amplifier 74b eliminates the negative edges by adding the signals input to its two input terminals.

Figure 23:
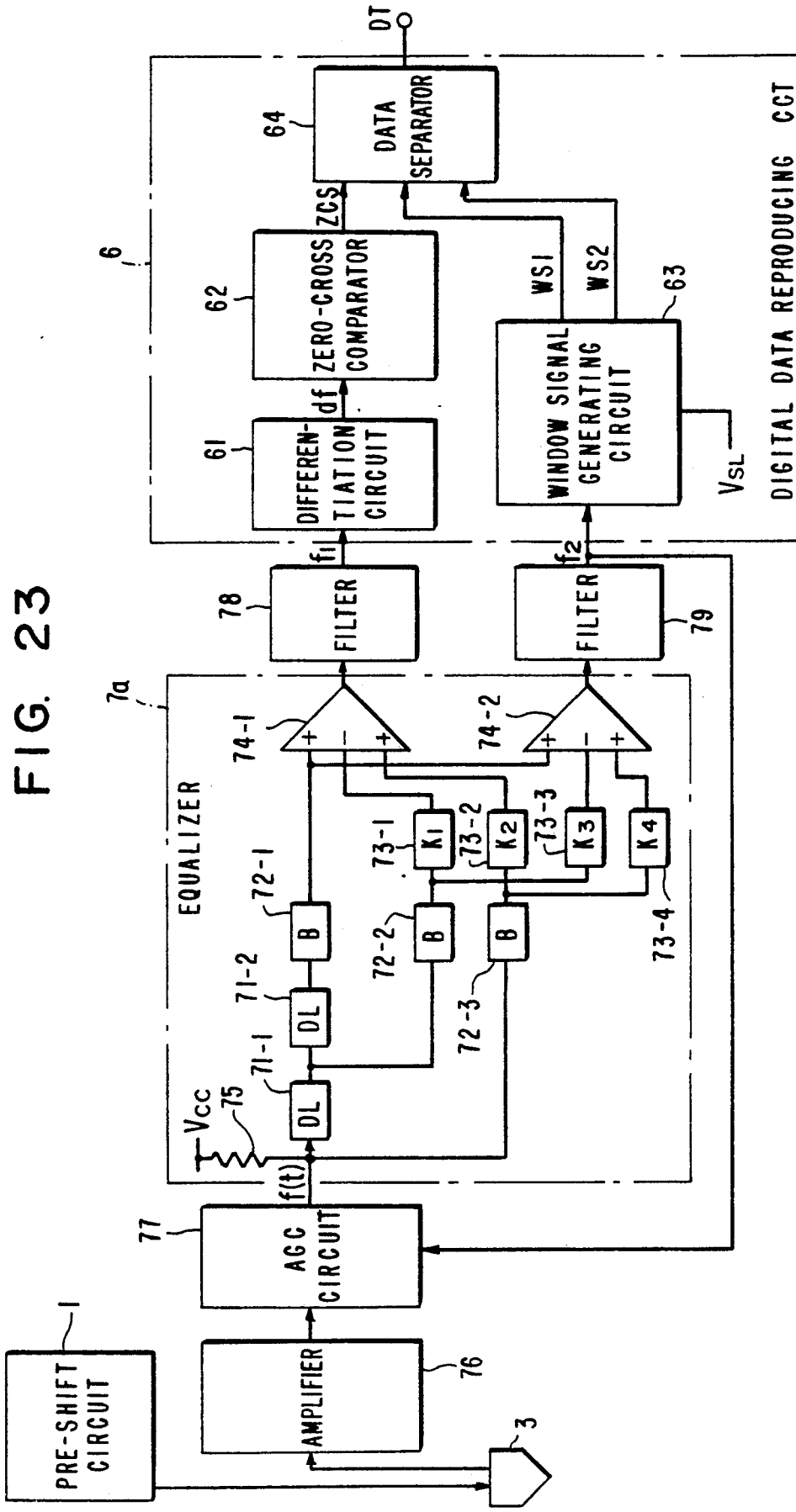

FIG. 23 shows the construction disclosed as another embodiment of the present invention. In the figure, the data reproducing circuit of the present invention is provided with a pre-shift circuit 1, a magnetic head 3, an equalizer 7a, a digital data reproducing circuit 6, an amplifier 76, an AGC circuit 77, and filters 78 and 79. This data reproducing circuit is, for example, used in a magnetic disc device containing a thin film magnetic head 3. In FIG. 23, the same elements as in FIGS. 1 and 20 are indicated by the same reference numerals.

The equalizer 7a consists of delay circuits 71-1 (delay time: $\tau 1$) and 71-2 (delay time: $\tau 2$), three buffers (buffer amplifiers) 72-1, 72-2 and 72-3, gain adjustment circuits 73-1 (gain: $k_1$), 73-2 (gain: $k_2$), 73-3(gain $k_3$), and 73-4(gain: $k_4$), and two differential amplifiers 74-1 and 74-2, and includes two equalizers which shares the delay circuits 71-1 and 71-2. The delay circuits 71-1 and 71-2 can be provided individually for each equalizer. Other elements include a resistor 75 to terminate the reflected signal, an amplifier 76 to amplify the received analog signal from the magnetic head 3, an AGC circuit 77 to adjust the gain of the received analog signal, and filters (low-pass filters) 78 and 79 to cut the high frequency range components at the differential amplifiers 4-1 and 74-2.

Three buffers 72-1 to 72-3, at the equalizer 7a, separate the input side and the output side, i.e. the side of the delay circuits 71-1 and 71-2 and AGC circuit 77, and the side of four gain adjustment circuits 73-1 to 73-4 and the differential amplifiers 74-1 and 74-2. For this function, the buffers 72-1 and 72-2 require extremely high input impedance. Thus, the signal which has passed through the delay circuits 71-1 and 71-2 is not reflected at the differential amplifiers 74-I and 74-2, but at the buffer 72-1, to generate the above mentioned reflected signal.

The equalized signal as the output of the equalizer 7a is, at the digital data reproducing circuit 6, used for peak position detection by differentiation, and for generation of window signal WS by comparing it with the predetermined slice level. Accordingly, when the equalizing amount is set to a large value, the equalized signal will have large shoulders, and the noises on the shoulders might be higher than the slice level. At the same time, in the data reproducing circuit which performs the peak shift compensation at both pre-shift circuit 1 and the equalizer 7a as in the present embodiment, the equalizing amount at the equalizer 7 should be set moderately, because the peak shift compensation is partly performed at the pre-shift circuit 1. Too small of an equalizing amount at the equalizer 7, however, cannot compensate the peak level decline due to high recording frequency, and the slice level for window signal generation cannot be set at a high level.

This embodiment is provided with two equalizers to obtain a pair of equalized signals $f_1$ and $f_2$. The first equalizer comprises a differential amplifier 74-1, gain adjustment circuits 73-1 and 73-2, delay circuits 71-1 and 71-2, and buffers 72-1 to 72-3, to obtain the signal $f_1$ (more exactly, the signal $f_1$ before it passes the filter 78). The second equalizer consists of a differential amplifier 74-2, gain adjustment circuits 73-3 and 73-4, delay circuits 71-1 and 71-2 and buffers 72-1 to 72-3, to obtain the signal $f_2$ (more exactly, the signal $f_2$ before it passes through the filter 79).

By using these equalizers, a pair of equalized signals $f_1$ and $f_2$ with different equalizing amounts can be generated. The equalizing signal $f_1$ to be input to the differentiation means 61 of the digital data reproducing circuit 6 shall be set with a moderate equalizing amount, because it just compensates the remaining peak shift which was not covered by the peak shift compensation at the pre-shift circuit 1. On the other hand, the equalized signal $f_2$ to be input to the window signal generating circuit 63 of the digital data reproducing circuit 6 shall be set with a large equalizing amount to compensate the peak level decline due to high recording frequency. Thus, by sharing the peak shift compensation between the pre-shift circuit 1 and a pair of equalizers, a good peak shift compensation can be performed.

The gain adjustment circuit 73-1 outputs the gain signals $K_1 f(t+\tau_1)$ and $K_1 f(t+\tau_1+2\tau_2)$ with a small gain $K_1$. This gain $K_1$ is for the peak shift compensation adjustment. Since this gain is used to perform about 60% of the peak shift compensation at the pre-shift circuit 1, it can be set at about 0.2, a much smaller value than the gain of 0.6 for the case where the peak shift compensation is performed at the equalizer 7a alone. Small settings of the gain rate prevent noise in the high frequency range from being excessively amplified at the output $f_1$ from the differential amplifier 74-1.

The gain adjustment circuit 73-2 outputs the gain signals $K_2 f(t)$ and $K_2 f(t+2(\tau_1+\tau_2))$ with a gain $K_2$. This gain $K_2$ is used to eliminate the negative edges. Since the negative edges have small values, this rate is set at a small value not more than the gain rate $K_1$.

Meanwhile, the gain adjustment circuit 73-3 outputs the gain signal $K_3 f(t+\tau_1)$ and $K_3 f(t+\tau_1+2\tau_2)$ with a large gain $K_3$. This gain $K_3$ is to compensate the peak level decline due to high recording frequency. $K_3$ is set at as large as about 0.7. The signal $f_2$ output by the differential amplifier 74-2 is used to generate the window signal WS, and no problem occurs even if high frequency components are amplified a little.

The gain adjustment circuit 73-4 outputs the gain signals $K_4 f(t)$ and $K_4 f(t+2(\tau_1+\tau_2))$ with a small gain $K_4$. This gain $K_4$ is similar to the gain $K_2$, and its value is also similar to that of $K_2$.

Figure 24:
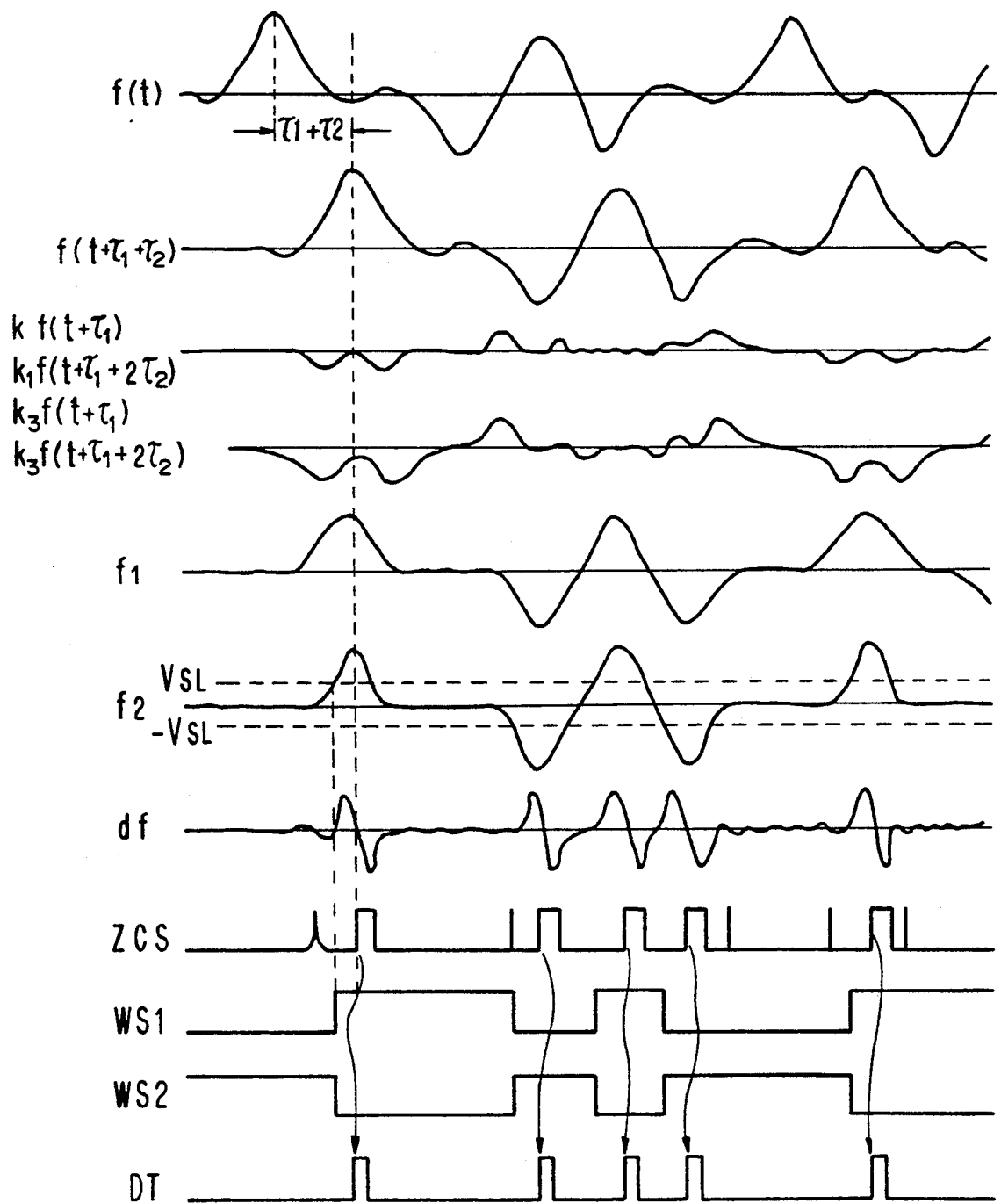
FIGS. 24 illustrates the waveform of the embodiment shown in FIG. 23.
Figure 26:
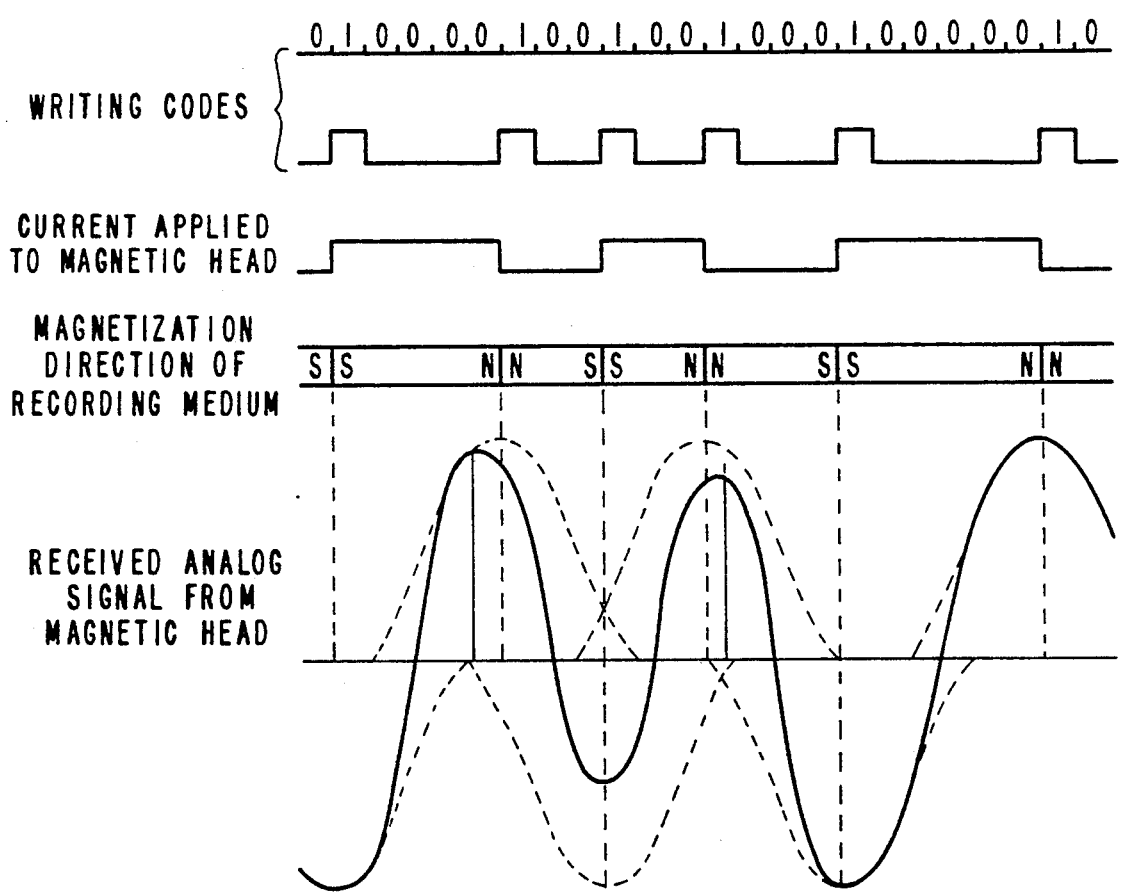
FIG. 26 illustrates the principle of the peak shift phenomenon.
Figure 27:
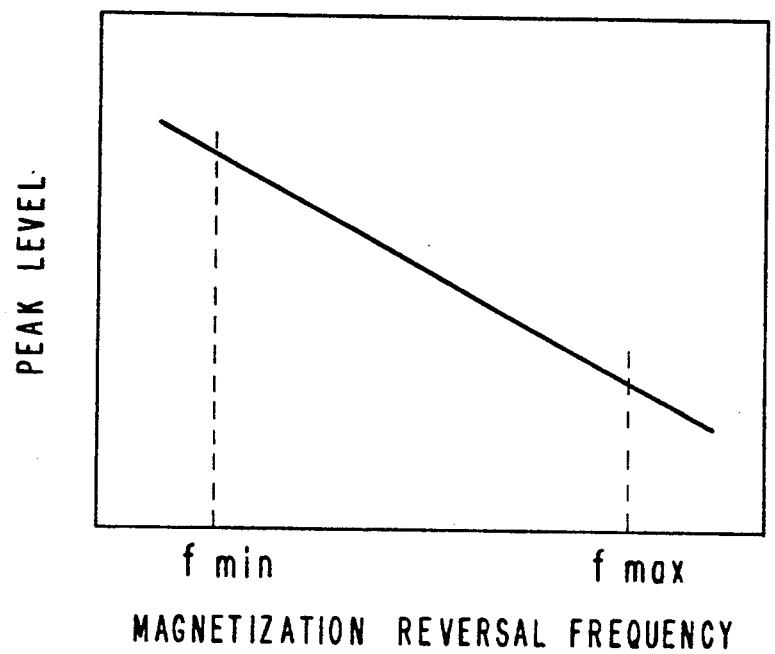
FIG. 27 shows the relation between the magnetization reversal and the peak level.
Figure 28:
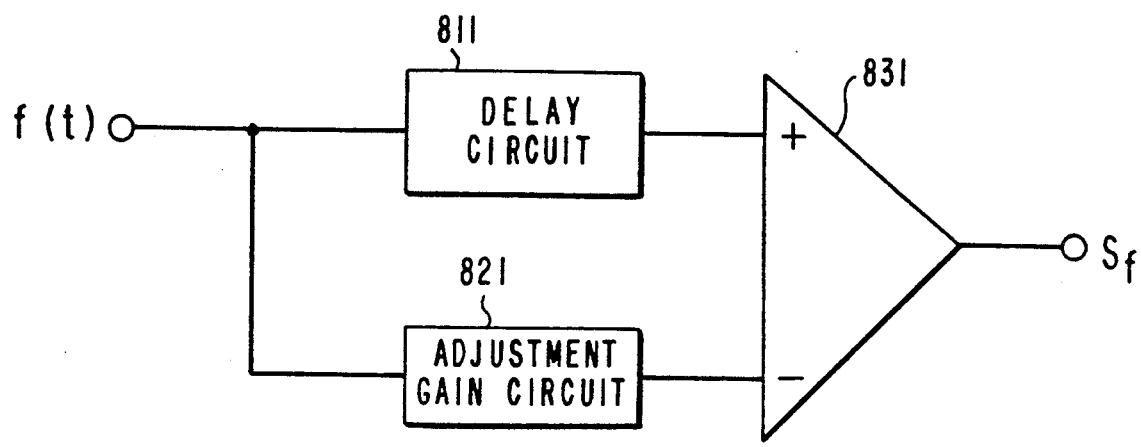
FIG. 28 shows the basic construction of the reflection type cosine equalizer.
Figure 29:
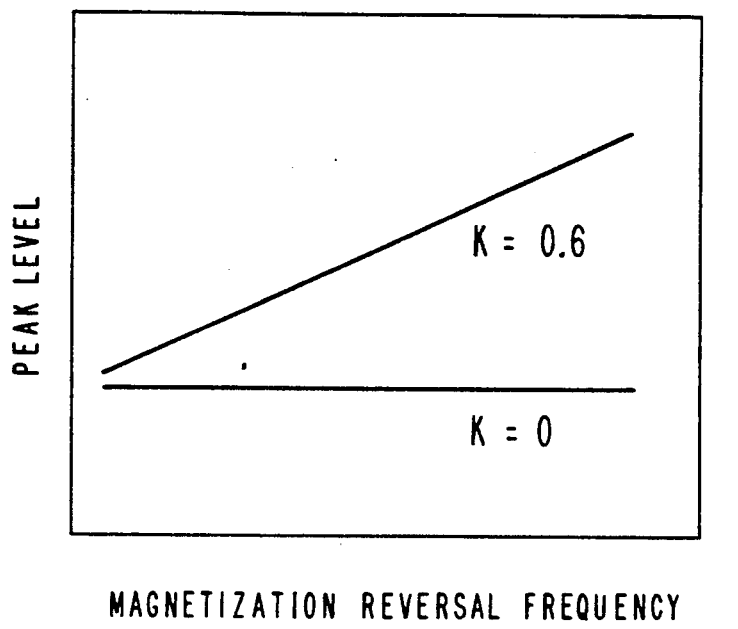
FIG. 29 shows the relation between the peak level and magnetization reversal frequency at the equalizer shown in FIG. 28.
Figure 32:
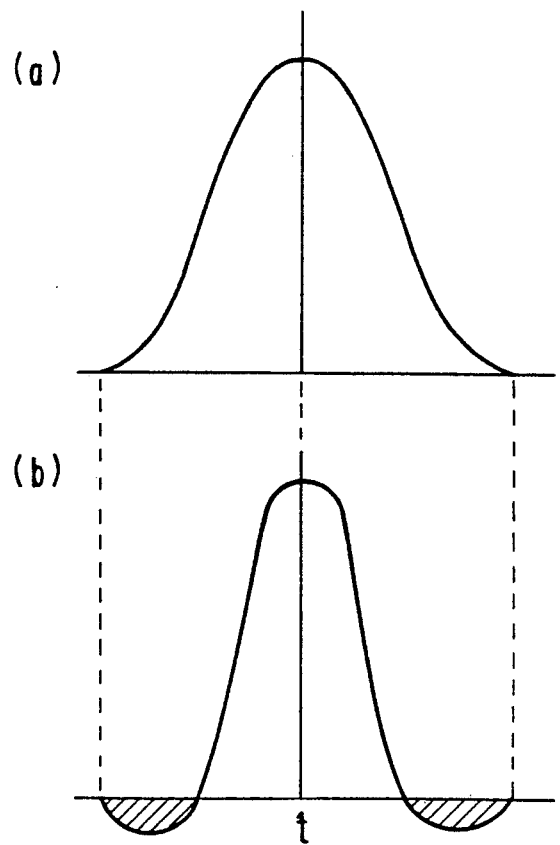
FIG. 32 (*a*) and (*b*) show the received analog signal containing negative edges.
Figure 30A:
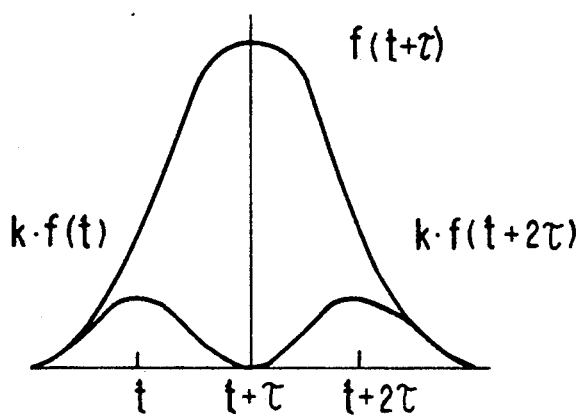
FIGS. 30 (*a*) and (*b*) and 31 (*a*) and (*b*) the output waveforms of the equalizer shown in FIG. 28.
Figure 31A:
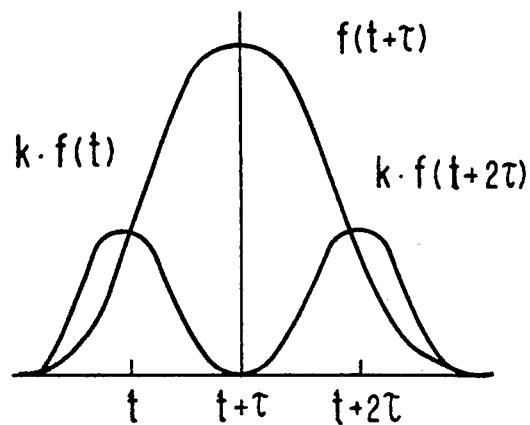
Figure 30B:
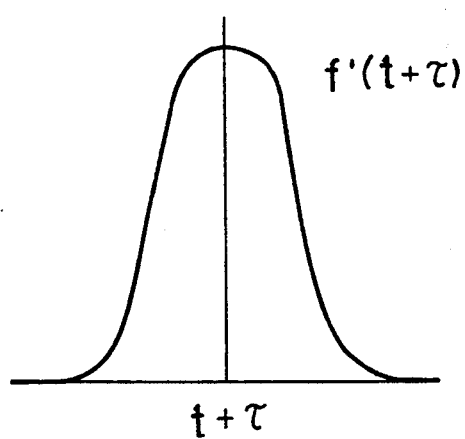
Figure 31B:
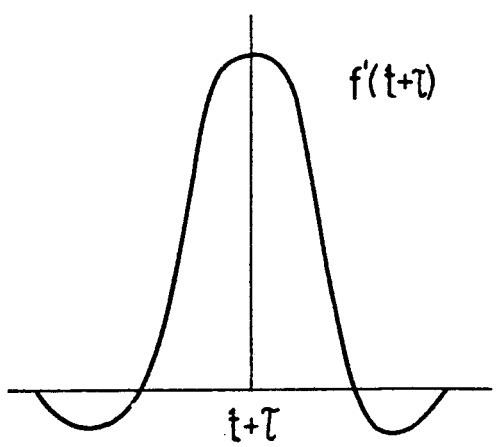

FIG. 24 shows the waveforms to illustrate the operation of the equalizer 7a and the digital data reproducing circuit 6 of the embodiment shown in FIG. 23. The operation is described below referring to FIGS. 23 and 24.

The received analog signal f(t) from the magnetic head 3 is amplified at the amplifier 76, AGC controlled at the AGC circuit 77, and input to the equalizer circuit 7a. This analog signal f(t) is delayed at the delay circuits 71-1 and 71-2 by the delay time $\tau_1+\tau_2$, to be the delay signal $f(t+\tau_1+\tau_2)$.

The gain adjustment circuit 73-1 outputs the adjusting gain signal $K_1 f(t+\tau_1)$ etc. at a small gain $K_1$, and the gain adjustment circuit 73-3 outputs the adjusting gain signal $K_3 f(t+\tau_1)$ etc. at a large gain $K_3$. These signals are input to the differential amplifiers 74-1 and 74-2 respectively. The difference between the delay signal $f(t+\tau_1+\tau_2)$ and the adjusting gain signal $K_1 f(t+\tau+1)$ etc. is output as the equalized signal $f_1$, and the difference between the delay signal $f(t+\tau_1+\tau_2)$ and the adjusting gain signal $K_3 f(t+\tau_1)$ etc. is output as the equalized signal $f_2$.

The gain adjustment circuits 73-2 and 73-4 outputs the adjusting gain signals $K_2 f$ etc. and $K_4 f$ etc. with small gains $K_2$ and $K_4$ respectively. These signals are input to the differential amplifiers 74-1 and 74-2, added to the delay signal $f(t+\tau_1+\tau_2)$ to eliminate the negative edges, so that the equalized signals $f_1$ and $f_2$ are output as the signals without negative edges.

The equalized signal $f_1$ compensates about 40% of the peak shift remaining after the recording process, to generate the signal waveform with almost complete peak shift compensation. The equalized signal $f_2$ practically has the same peak level at magnetization reversals. Thus, the fixed slice level $V_{SL}$ for window signal generation can be highly set, without the possibility that the noises due to medium defects or otherwise on shoulders exceeds the slice level $V_{SL}$, and a good window signal WS can be generated. Thus, with assuring noise margin by eliminating the negative edges, a sufficient peak shift compensation can be realized.

Figure 25:
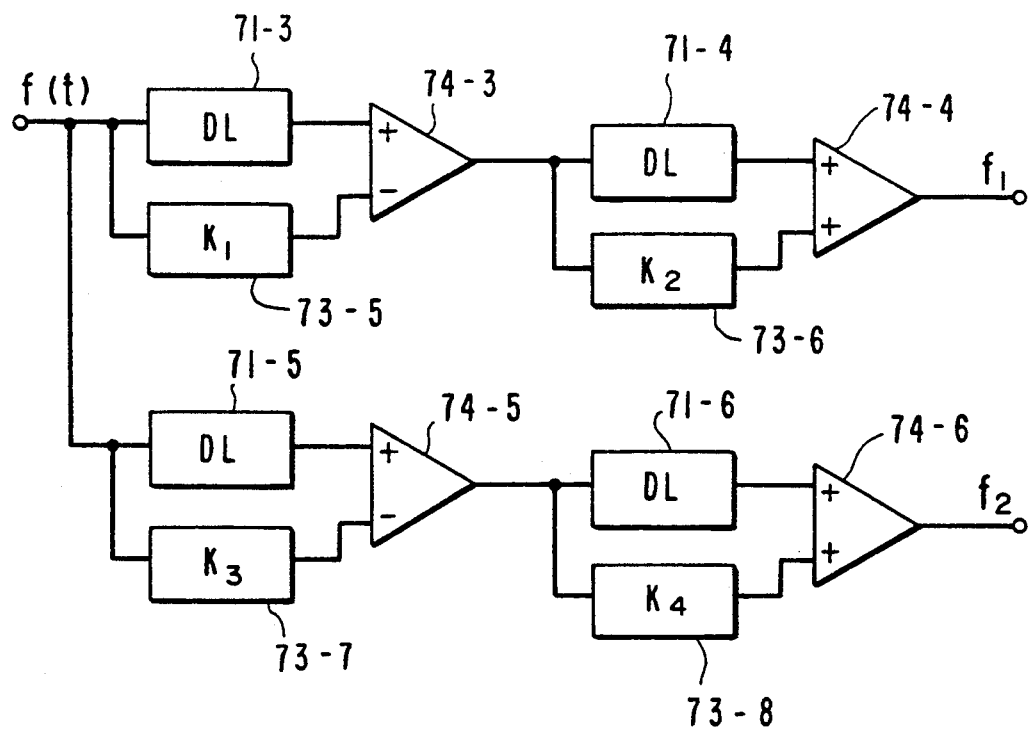
FIG. 25 shows the construction of another embodiment according to the present invention.

FIG. 25 shows another construction of the equalizer 7a shown in FIG. 23. The equalizer shown in FIG. 25 consists of four delay circuits 71-3 to 71-6, four gain adjustment circuits 73-5 to 73-8, two differential amplifiers 74-3 and 74-5, and two addition amplifiers 74-4 and 74-6, and includes two equalizers. One of the equalizers consists of delay circuits 71-3 and 71-4, gain adjustment circuits 73-5 and 73-6, a differential amplifier 74-3 and an addition amplifier 74-4, and has the equivalent function as the equalizer on the side of the differential amplifier 74-1 in FIG. 23. The other equalizer consists of delay circuits 71-5 and 71-6, adjustment gain circuits 73-7 and 73-8, a differential amplifier 74-5 and an addition amplifier 74-6, and has the equivalent function as the equalizer on the side of differential amplifier 74-2 shown in FIG. 23.

An alternative embodiment of the data reproducing circuit of the present invention utilizes two equalized signal generating circuits which comprise a first delay circuit which receives said analog signal from said data recording and sensing means and outputs a first delay signal, a first gain circuit which receives said analog signal from said data recording and sensing means and outputs a first gain signal, a differentiation means connected to said first delay circuit and said first gain circuit, which subtracts said first gain signal from said first delay signal and outputs a first output signal obtained by said subtraction, a second delay circuit for providing and a second delay signal responsive to said first delay signal, a second gain circuit to receive said first output signal and output a second gain signal, and an adder means which is connected to said second delay circuit and said second gain circuit, adds said second gain signal and said second delay signal, and outputs one of the first and second signals.

Although the preferred embodiments according to the present invention are described in the foregoing, the present invention can be embodied in a variety of forms within the scope and spirit of the present invention.

What is claimed is:

1. A data reproducing circuit for a memory system, comprising:
    data recording and sensing means for writing magnetization reversal patterns corresponding to a shifted written digital signal onto a magnetic recording medium and for reading an analog signal corresponding to said magnetization reversal patterns from said magnetic recording medium;
    pre-shift means operatively connected to said data recording and sensing means for shifting a written digital signal supplied to said data recording and sensing means for an amount according to a pattern of said written digital signal to produce the shifted written digital signal;
    equalizing means including at least one of a combination of reflection-type cosine equalizers and a three-input reflection-type cosine equalizer, operatively connected to said data recording and sensing means, for receiving the analog signal from said data recording and sensing means and for generating first and second equalized signals based on said analog signal using the at least one of the combination of reflection-type cosine equalizers and the three-input reflection-type cosine equalizer; and
    digital data reproducing means operatively connected to said equalizing means for receiving said first and second equalized signals, for differentiating said first equalized signal, for generating a window signal which is activated when said second equalized signal exceeds a predetermined threshold level, and for outputting a pulse type reproducing signal when said window signal is activated and when said differentiated first equalized signal exceeds the predetermined threshold level.

2. A data reproducing circuit according to claim 1, wherein said data recording and sensing means includes a common magnetic head for reading or writing the magnetization reversal patterns.

3. A data reproducing circuit according to claim 1, wherein said data recording and sensing means includes a first magnetic head for writing the magnetization reversal patterns, and a second magnetic head for reading the analog signal corresponding to the magnetization reversal patterns.

4. A data reproducing circuit according to claim 1, wherein said pre-shift means includes a shift register containing a plurality of registers connected in series, and a combinational logic circuit for determining the shift amount for said written digital signal according to the pattern of said written digital signal stored in a plurality of said registers forming said shift register and for supplying the shifted written digital data to said data recording and sensing means.

5. A data reproducing circuit according to claim 1, wherein said digital data reproducing means comprises:
   a differentiator for receiving said first equalized a signal and for differentiating said first equalized signal by a predetermined differential constant,
   a window generation circuit for receiving said second equalized signal and for generating said window signal when said second equalized signal exceeds said predetermined threshold level, and
   a pulse generation circuit, operatively connected to said differentiator and said window generation circuit, for generating said pulse type reproducing signal which is activated when said differentiated first equalized signal exceeds said predetermined threshold level and when said window signal is activated.

6. A data reproducing circuit according to claim 1, wherein said digital data reproducing means comprises:
   a window generation circuit for discriminating a signal from said data recording and sensing means and having an amplitude of a predetermined threshold value for generating a window signal when said signal exceeds said predetermined threshold value,
   a selective differentiating circuit, operatively connected to said window generation circuit, for receiving said window signal, for differentiating another signal corresponding to said signal to be discriminating and having an amplitude higher than said amplitude of said constant, and for gating said differentiated signal with said window signal, and
   a pulse generation circuit, operatively connected to said selective differentiating circuit, for generating said pulse type reproducing signal which is activated when said gated differentiated signal exceeds a predetermined pulsing threshold level.

7. A data reproducing circuit according to claim 1, further comprising:
   automatic gain control means operatively connected between said data recording and sensing means and said equalizing means for controlling a gain of said analog signal according to at least one of said first and second equalized signals output from said equalizing means.

8. A data reproducing circuit according to claim 1, further comprising:
   amplifying means operatively connected between said data recording and sensing means and said equalizing means for amplifying said analog signal.

9. A data reproducing circuit according to claim 1, wherein said equalizing means comprises:
   a first equalized signal generating circuit for correcting a shift of peak positions in said analog signal to generate said first equalized signal, and
   a second equalized signal generating circuit for correcting an amplitude variation of said analog signal to generate said second equalized signal.

10. A data reproducing circuit according to claim 1, wherein said equalizing means is provided with an equalized signal generating circuit for compensating peak shift of said analog signal, for generating a first signal with said peak shift compensated, for correcting amplitude variation of said analog signal, and for generating a second signal with amplitude variation of said analog signal corrected.

11. A data reproducing circuit for a memory system, comprising:
    data recording and sensing means for writing magnetization reversal patterns corresponding to a shifted written digital signal onto a magnetic recording medium and for reading an analog signal corresponding to said magnetization reversal patterns from said magnetic recording medium;
    pre-shift means operatively connected to said data recording and sensing means for shifting a written digital signal supplied to said data recording and sensing means for an amount according to a pattern of said written digital signal to produce the shifted written digital signal;
    equalizing means operatively connected to said data recording and sensing means for receiving the analog signal from said data recording and sensing means and for generating first and second equalized signals based on said analog signal; and
    digital data reproducing means operatively connected to said equalizing means for receiving said first and second equalized signals, for differentiating said first equalized signal, for generating a window signal which is activated when said second equalized signal exceeds a predetermined threshold level, and for outputting a pulse type reproducing signal when said window signal is activated and when said differentiated first equalized signal exceeds the predetermined threshold level,
    said equalizing means: including
    a first equalizing signal generation circuit for generating a first equalized signal f1 expressed by $$f1 = f(t+\tau) - k_1(f(t) + [(]f(t+2\tau))$$

where, f(t) is said analog signal sensed by said data recording and sensing means,
    $\tau$ is a delay time, and
    $k_1$ is a first equalizing gain; and
    a second equalizing signal generation circuit for generating a second equalized signal f2 expressed by
    $$f2 = ff(t+\tau) - k_2(f(t) + f(t+2\tau))$$
    where, $k_2$ is a second equalizing gain.

12. A data reproducing circuit according to claim 11, wherein said first equalizing signal generation circuit comprises:
    a first delay circuit including an input terminal and an output terminal for receiving said analog signal and for delaying said analog signal by said delay time,
    a first gain circuit including an output terminal and an input terminal connected to the input terminal of said first delay circuit and having said first equalizing gain, and
    a first subtracting circuit including a first input terminal connected to the output terminal of said first delay circuit, and having a high input impedance, whereby the delayed analog signal from said first delay circuit is reflected to said first delay circuit, and including a second input terminal connected to the output terminal of said first gain circuit, wherein
    said first delay circuit outputs said first delayed signal $f(t+\tau)$ to said first input terminal of said first subtracting circuit and a second delay signal $f(t+2\tau)$, based upon said reflection signal from said first input terminal of said first subtracting circuit, to said input terminal of said first gain circuit, wherein said first gain circuit outputs a signal of $k_1 \cdot k(t)$ and a signal of $k_1 \cdot f(t+2\tau)$ to said second input terminal of said first subtracting circuit, wherein said first subtracting circuit subtracts the signal supplied from said first gain circuit from the signal supplied from said first delay circuit, to output said first equalized signal f1, and wherein said second equalizing signal generation circuit comprises:

a second delay circuit including an input terminal and an output terminal for receiving said analog signal and for delaying said analog signal by said delay time, a second gain circuit including an input terminal connected to the input terminal of said second delay circuit and an output terminal, and having said second equalizing gain, and a second subtracting circuit including a first input terminal connected to the output terminal of said second delay circuit, and having a high input impedance, whereby the delayed analog signal from said second delay circuit is reflected to said second delay circuit, and including a second input terminal connected to the output terminal of said second gain circuit, wherein said second delay circuit outputs a third delayed signal $f(t+\tau)$ to said first input terminal of said second subtracting circuit and a fourth delay signal $f(t+2\tau)$, based upon said reflection signal from said first input terminal of said second subtracting circuit, to said input terminal of said second gain circuit, wherein said second gain circuit outputs a signal of $k_2 \cdot f(t)$ and a signal of $k_2 \cdot f(t+2\tau)$ to said second input terminal of said second subtracting circuit, and wherein said second subtracting circuit subtracts the signal supplied from said second gain circuit from the signal supplied from said second delay circuit, to output said second equalized signal f2.

13. A data reproducing circuit according to claim 11, wherein said first equalizing gain $k_1$ is set at a low level according to said shift amount at said pre-shift means, and said second equalizing gain $k_2$ is set greater than said first equalizing gain $k_1$.

14. A data reproducing circuit according to claim 11, wherein said first equalizing signal generation circuit comprises:

a delay circuit including an input terminal and an output terminal for receiving said analog signal and for delaying said analog signal by said delay time, a first gain circuit including an output terminal and an input terminal connected to the input terminal of said delay circuit, and having said first equalizing gain, and a first subtracting circuit including a first input terminal connected to the output terminal of said delay circuit, and having a high input impedance, whereby the signal from said delay circuit is reflected to said delay circuit, and including a second input terminal connected to the output terminal of said first gain circuit, and wherein said second equalizing signal generation circuit comprises:

a second gain circuit including an output terminal and an input terminal connected to the input terminal of said delay circuit, and having said second equalizing gain, and a second subtracting circuit including a first input terminal connected to the output terminal of said delay circuit, and including a second input terminal connected to the output terminal of said second gain circuit, wherein said delay circuit output said first delayed signal $f(t+\tau)$ to said first input terminals of said first and second subtracting circuits and said second delay signal $f(t+2\tau)$, based upon a reflection signal from said first input terminal of said first subtracting circuit, to said input terminals of said first and second gain circuits, wherein said first gain circuit outputs a signal of $k_1 \cdot f(t)$ and $k_1 \cdot f(t+2\tau)$ to said second input terminal of said first subtracting circuit, wherein said first subtracting circuit subtracts the signal supplied from said first gain circuit from the signal supplied from said delay circuit, to output said first equalized signal f1, wherein said second gain circuit output a signal of $k_2 \cdot f(t)$ and $k_2 \cdot f(t+2\tau)$ to said second input terminal of said second subtracting circuit, and wherein said second subtracting circuit subtracts the signal supplied from said second gain circuit from the signal supplied from said delay circuit, to output said second equalized signal f2.

15. A data reproducing circuit for a memory system, comprising:

data recording and sensing means for writing magnetization reversal patterns corresponding to a shifted written digital signal onto a magnetic recording medium and for reading an analog signal corresponding to said magnetization reversal patterns from said magnetic recording medium;

pre-shift means operatively connected to said data recording and sensing means for shifting a written digital signal supplied to said data recording and sensing means for an amount according to a pattern of said written digital signal to produce the shifted written digital signal;

equalizing means operatively connected to said data recording and sensing means for receiving the analog signal from said data recording and sensing means and for generating first and second equalizing signals based on said analog signal; and digital data reproducing means operatively connected to said equalizing means for receiving said first and second equalized signals, for differentiating said first equalized signal, for generating a window signal which is activated when said second equalized signal exceeds a predetermined threshold level, and for outputting a pulse type reproducing signal when said window signal is activated and when said differentiated first equalized signal exceeds the predetermined threshold level; and first and second low pass filter means operatively connected between said equalizing means and said digital data reproducing means for cutting high frequency components of said first and second equalized signals supplied by said equalizing means.

16. A data reproducing circuit for a memory system, comprising:

data recording and sensing means for writing magnetization reversal patterns corresponding to a shifted written digital signal onto a magnetic recording medium and for reading an analog signal corresponding to said magnetization reversal patterns from said magnetization recording medium;

pre-shift means operatively connected to said data recording and sensing for shifting a written digital signal supplied to said data recording and sensing means for an amount according to a pattern of said written digital signal to produce the shifted written digital signal;

equalizing means operatively connected to said data recording and sensing means for receiving the analog signal from said data recording and sensing means and for generating first and second equalized signal based on said analog signal; and digital data reproducing means operatively connected to said equalizing means for receiving said first and second equalized signals, for differentiating said first equalized signal, for generating a window signal which is activated when said second equalized signal exceeds a predetermined threshold level, and for outputting a pulse type reproducing signal when said window signal is activated and when said differentiated first equalized signal exceeds the predetermined threshold level, said equalizing means including a first equalized signal generating circuit for correcting a shift of peak positions in said analog signal to generate said first equalized signal, and a second equalized signal generating circuit for correcting an amplitude variation of said analog signal to generate said second equalized signal;

each of said first and second equalized signal generating circuits including a first delay circuit including an input terminal for receiving said analog signal and an output terminal for outputting a first delay signal, a first gain circuit including an input terminal for receiving said analog signal and an output terminal for outputting a first gain signal, differentiation means including a first input terminal connected to the output terminal of said first delay circuit, a second input terminal connected to the output terminal of said first gain circuit and an output terminal, for subtracting said first gain signal from said first delay signal and for outputting a first output signal obtained by said subtraction on the output terminal of said differentiation means, a second delay circuit, including an output terminal and an input terminal connected to at least one of the output terminals of said first delay circuit and said differentiation means, for providing a second delay signal responsive to said first delay signal, a second gain circuit including an input terminal connected to the output terminal of said differentiation means, for receiving said first output signal and an output terminal for outputting a second gain signal, and adder means including a first input terminal connected to the output terminal of the second delay circuit and a second input terminal connected to the output terminal of the second gain circuit, for adding said second gain signal and said second delay signal, and for outputting at least one of said first and second equalized signals.

17. A data reproducing circuit according to claim 16, wherein a gain of said first gain circuit contained in said first equalized signal generating circuit is moderately set according to said amount of shift performed at said pre-shift means, and a gain of said first gain circuit contained in said second equalized signal generating circuit is set greater than the gain of said first gain circuit contained in said first equalized signal generating circuit.

18. A data reproducing circuit according to claim 16, wherein a gain of said second gain circuit is set to an equal or lower level than a gain of said first gain circuit.

19. A data reproducing circuit according to claim 16, wherein each of said first and second equalized signal generating circuits comprises:

a first delay circuit including an input terminal for receiving said analog signal and an output terminal for outputting a first delay signal, a second delay circuit including an input terminal connected to an output terminal of said first delay circuit for receiving said first delay signal and an output terminal for outputting a second delay signal, a first gain circuit including an input terminal connected to an output terminal of said first delay circuit for receiving said first delay signal from the output terminal of said first delay circuit and an output terminal for outputting a first gain signal, a second gain circuit including an input terminal connected to the input terminal of said first delay circuit for receiving said analog signal and an input terminal for outputting a second gain signal, and adder/subtractor means including first, second and third input terminals, each connected to the output terminals of the second delay circuit, the first gain circuit, and the second gain circuit, respectively, for subtracting said first gain signal from said second delay signal, for adding said second gain signal to a subtraction result derived from subtracting said first gain signal from said second delay signal, and for outputting at least one of said first and second equalized signals.

20. A data reproducing circuit according to claim 19, wherein a gain of said first gain circuit contained in said first equalized signal generating circuit is moderately set according to said amount of shift performed at said pre-shift means, and wherein a gain of said first gain circuit contained in said second equalized signal generating circuit is set greater that a gain of said first gain circuit contained in said first equalized signal generating circuit.

21. A data reproducing circuit according to claim 19, wherein a gain of said second gain circuit is set at an equal or lower level than a gain of said first gain circuit.

22. A data reproducing circuit for a memory system, comprising:

data recording and sensing means for writing magnetization reversal patterns corresponding to a shifted written digital signal onto a magnetization recording medium and for reading an analog signal corresponding to said magnetization reversal patterns from said magnetic recording medium;

pre-shift means operatively connected to said data recording and sensing means for shifting a written digital signal supplied to said data recording and sensing means for an amount according to a pattern of said written digital signal to produce the shifted written digital signal;

equalizing means operatively connected to said data recording and sensing means for receiving the analog signal from said data recording and sensing means and for generating first and second equalized signals based on said analog signal; and digital data reproducing means operatively connected to said equalizing means for receiving said first and second equalized signals, for differentiating said first equalized signal, for generating a window signal which is activated when said second equalized signal exceeds a predetermined threshold level, and for outputting a pulse type reproducing signal when said window signal is activated and when said differentiated first equalized signal exceeds the predetermined threshold level, said equalizing means including a first delay circuit including an input terminal for receiving said analog signal and an output terminal for outputting a first delay signal, a first gain circuit including an input terminal for receiving said analog signal and an output terminal for outputting a first gain signal, differentiation means, including an output terminal, and first and second input terminals, each of the first and second input terminals being connected to the output terminal of said first delay circuit and the output terminal of said first gain circuit, respectively, for subtracting said first gain signal from said first delay signal, and for outputting the first output signal obtained by said subtraction through the output terminal of said differentiation means, a second delay circuit including an input terminal connected to the output terminal of the differentiation means for receiving said first delay signal and an output terminal for outputting a second delay signal, a second gain circuit including an input terminal connected to the output terminal of the differentiation means for receiving said first output signal and an output terminal for outputting a second gain signal, and adder means, including first and second input terminals each being connected to the output signals of said second delay circuit and said second gain circuit, respectively, for adding said second gain signal and said second delay signal and for outputting an addition result as a signal common to said first and second equalized signals.

23. A data reproducing circuit according to claim 22, wherein a gain of said second gain circuit is set at an equal or lower level than a gain of said first gain circuit.

24. A data reproducing circuit for a memory system, comprising:

data recording and sensing means for writing magnetization reversal patterns corresponding to a shifted written digital signal onto a magnetic recording medium and for reading an analog signal corresponding to said magnetization reversal patterns from said magnetization recording medium;

pre-shift means operatively connected to said data recording and sensing means for shifting a written digital signal supplied to said data recording and sensing means for an amount according to a pattern of said written digital signal to produce the shifted written digital signal;

equalizing means operatively connected to said data recording and sensing means for receiving the analog signal from said data recording and sensing means and for generating first and second equalized signals based on said analog signal; and digital data reproducing means operatively connected to said equalizing means for receiving said first and second equalized signals, for differentiating said first equalized signal, for generating a window signal which is activated when said second equalized signal exceeds a predetermined threshold level, and for outputting a pulse type reproducing signal when said window signal is activated and when said differentiated first equalized signal exceeds the predetermined threshold level, said equalizing means including a first delay circuit including an input terminal for receiving said analog signal and an output terminal for outputting a first delay signal, a second delay circuit including an input terminal connected to the output terminal of said first delay circuit for receiving said first delay signal and an output terminal for outputting a second delay signal, a first gain circuit including an input terminal connected to the output terminal of said first delay circuit for receiving said first delay signal output and an output terminal for outputting a first gain signal, a second gain circuit including an input terminal for receiving said analog signal and an output terminal for outputting a second gain signal, and adder/subtractor means including first, second and third input terminals connected to the output terminal of the second delay circuit, the output terminal of the first gain circuit, and the output terminal of the second gain circuit, respectively, for subtracting said first gain signal from said second delay signal, for subtracting said first gain signal from said second delay signal, for adding said second gain signal to a subtraction result derived from subtracting said first gain signal from said second delay signal and for outputting an addition result derived from adding said second gain signal to the subtraction result as a signal common to said first and second equalized signals.

25. A data reproducing circuit according to claim 24, wherein a gain of said second gain circuit is set at an equal or lower level than a gain of said first gain circuit.

26. A method of writing and reading data having a pattern using a magnetic recording medium, comprising the steps of:

a) shifting data according to the pattern of the data;

b) writing the shifted data onto the magnetic recording medium;

c) reading the shifted data from the magnetic recording medium to provide the first signal;

d) equalizing the first signal to generate second and third signals using at least one of a combination of reflection-type cosine equalizers and a three-input reflection-type cosine equalizer; and e) reproducing the data by using the third signal to generate a window signal and by differentiating the second signal to generate an output signal which is activated when the differentiated second signal exceeds a predetermined value and when the window signal is activated.

* * * * *

UNITED STATES PATENT AND TRADEMARK OFFICE
CERTIFICATE OF CORRECTION

PATENT NO.   : 5,163,003
DATED        : November 10, 1992
INVENTOR(S)  : Toshiki KIMURA It is certified that error appears in the above-indentified patent and that said Letters Patent is hereby corrected as shown below:

On the title page: [56] References cited "465,541 1/1890"

should be --465,541 1/1990--.

Column 19, line 10, delete "a"

(second occurrence).

Signed and Sealed this

First Day of March, 1994

Attest:

BRUCE LEHMAN

Attesting Officer

Commissioner of Patents and Trademarks